United States Patent
Gochou et al.

(10) Patent No.: US 6,400,527 B1
(45) Date of Patent: Jun. 4, 2002

(54) THIN FILM MAGNETIC HEAD HAVING UPPER CORE LAYER WITH NARROW TRACK WIDTH

(75) Inventors: Hideki Gochou; Kiyoshi Kobayashi; Naruaki Oki, all of Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/437,888

(22) Filed: Nov. 9, 1999

(30) Foreign Application Priority Data

Nov. 13, 1998 (JP) .......................... 10-323261
Nov. 16, 1998 (JP) .......................... 10-325012
Feb. 22, 1999 (JP) .......................... 11-043214

(51) Int. Cl.[7] ................................ G11B 5/31
(52) U.S. Cl. ....................................... 360/126
(58) Field of Search ........................ 360/126

(56) References Cited

U.S. PATENT DOCUMENTS

| | | |
|---|---|---|
| 5,130,877 A | 7/1992 | Hsie et al. |
| 5,184,394 A | 2/1993 | Hsie et al. |
| 5,606,478 A | 2/1997 | Chen et al. |
| 5,621,596 A | 4/1997 | Santini |
| 5,658,470 A | 8/1997 | Schultz et al. |
| 5,706,152 A | 1/1998 | Honjo et al. |
| 5,901,431 A | 5/1999 | Santini |

FOREIGN PATENT DOCUMENTS

| | | |
|---|---|---|
| JP | 2-254614 | 10/1990 |
| JP | 3-156714 | 7/1991 |
| JP | 4-125808 | 4/1992 |
| JP | 5-151528 | 6/1993 |
| JP | 9-138909 | 5/1997 |

*Primary Examiner*—Robert S. Tupper
(74) *Attorney, Agent, or Firm*—Brinks Hofer Gilson & Lione

(57) ABSTRACT

To provide a thin film magnetic head having an upper core layer whose dimensions are controlled with high precision, which can yield high density recording on a magnetic recording medium, and a production process of the same, an upper core layer is formed on a first, second and third insulation layers and a gap layer, and has a narrow tip region, a connecting portion and a body portion, in which the tip region is connected via the gap layer to a lower core layer on a head surface facing a magnetic recording medium, the connecting portion is connected to the tip region in a nearly identical width, and is formed on a lower region of a first sloping region and an inclined plane K, and the body portion extends wider from the connecting portion and covers part of a coil layer. In a thin film magnetic head having a dual coil layer structure, a third insulation layer having a third apex and a third sloping region is formed to cover a second coil layer, and the third apex is located on a second plane region, and the top of a second insulation layer and the third sloping region establish a first pocket region P1.

8 Claims, 21 Drawing Sheets

THIN FILM MAGNETIC HEAD HAVING UPPER CORE LAYER WITH NARROW TRACK WIDTH

BACKGROUND OF THE INVENTION

1. Field of the Invention

The present invention relates to a thin film magnetic head and to a production process thereof. More particularly it relates to a thin film magnetic head having an upper core with a narrow track width on an inductive head surface facing to a magnetic recording medium, and to a production process thereof.

2. Description of the Related Art

FIGS. 16A and 16B are diagrams each illustrating a conventional thin film magnetic head, in which FIG. 16A is a cross sectional side view of its substantial part, and FIG. 16B is a top view of its upper core layer. FIGS. 17A through 17E are cross sectional side views showing various steps involved in producing a conventional thin film magnetic head. FIGS. 18A and 18B are illustrations of a production process of the conventional thin film magnetic head, in which FIG. 18A is a schematic diagram illustrating a reflection behavior of light exposure at sloping regions in a photolithography step, and FIG. 18B is a top view showing an upper core layer obtained by photolithography. FIGS. 19A and 19B are cross sectional side views of a substantial part of a thin film magnetic head described in U.S. Pat. No. 25,621,596.

An inductive write head for writing magnetic signals on a magnetic recording medium such as a hard disk is laminated on a magnetoresistive read head (MR read head) for reading magnetic signals with the aid of the magnetoresistive effect, at a trailing edge of a slider of a floating type magnetic head facing a magnetic recording medium, and the resultant laminate is used as a composite thin film magnetic head.

In the thin film magnetic head shown in FIG. 16A, a lower core layer 51 of an inductive write head is composed of an Fe—Ni alloy (e.g., permalloy) or another highly magnetically permeable material, and serves also as an upper shield layer of an MR read head having an magnetoresistive read element (MR read element) 20. A gap layer 52 of $Al_2O_3$ or another nonmagnetic material and is formed to a thickness of Gl on the lower core layer 51.

A first insulation layer 53 of a resist material or another organic resinous material is formed on the gap layer 52 and slopes upward with respect to the top of the gap layer 52. The first insulation layer 53 has a first forward end or apex 53a and a first sloping region 53b extending upward from the first apex 53a, in which the first apex 53a establishes a zero throat height which, in turn, defines a gap depth Gd. A coil layer 54 is composed of Cu or another low-resistance conductive material, and is formed helical in plane on top of the first insulation layer 53.

A second insulation layer 55 of a resist material or another organic resinous material is formed on the first insulation layer 53 so as to cover the coil layer 54, and on the second insulation layer 55 is laminated a third insulation layer 56. The second and third insulation layers 55 and 56 have a second sloped apex 55a and its second sloping region 55b, and a third sloped apex 56a and its third sloping region 56b, respectively. An inclined plane K1 is constituted by the first, second and third sloping regions 53b, 55b and 56b which are formed nearly flush with one another. The inclined plane K1 is set to have a predetermined angle (apex angle) θ1 with respect to the gap layer 52.

An upper core layer 57 of an Fe—Ni alloy (e.g., permalloy) or another magnetic material is formed above the first, second, and third insulation layers 53, 55 and 56, and the gap layer 52. The upper core layer 57 is provided with a narrow tip region 57a, a connecting portion 57b, a body portion 57c, and a back end region (not shown); in which the tip region 57a is connected via the gap layer 52 to the lower core layer 51 on a surface facing a magnetic recording medium; the connecting portion 57b is connected to the tip region 57a in a nearly identical width and is formed on the inclined plane K1; the body portion 57c extends wider from the connecting portion 57b, and covers part of the coil layer 54; and the back end region is magnetically connected via a hole to the lower core layer 51 and is wrapped with the coil layer 54 therearound, which hole is formed in the gap layer 52 and the first insulation layer 53 at a position which is nearly the center of the coil layer 54 (FIG. 16B). A connecting region between the connecting portion 57b and the body portion 57c on the inclined plane K1 is called a pole straight Ps.

A magnetic gap G has a gap length Gl and a gap depth Gd, and the gap length Gl is determined by a distance between the lower core layer 51 and the tip region 57a connected via the gap layer 52, i.e., the thickness of the gap layer 52. The gap depth Gd is determined by a depth of the tip region 57a, that is, a distance between an air bearing surface (ABS) A which is for facing the magnetic recording medium, the left end shown in the figure, and the first apex 53a (zero throat height Z). In a composite thin magnetic head, the lower core layer 51 also serves as an upper shield layer of an MR head, and has a width larger than that of the tip region 57a of the upper core layer 57. A track width Tw is therefore determined by the width of the tip region 57a.

In the inductive write head configured as above, a recording current is applied to the coil layer 54 and a recording magnetic field is induced to the lower and upper core layers 51 and 57, and magnetic signals are recorded on a magnetic recording medium through a leakage magnetic field, in the air bearing surface (ABS) A, from the magnetic gap G between the lower core layer 51 and the tip region 57a of the upper core layer 57.

Next, a production process of the above conventional thin film magnetic head will be described. Initially, the gap layer 52 having a thickness (gap length) of Gl is formed from $Al_2O_3$ or another nonmagnetic material on the lower core layer 51 of an Fe—Ni alloy or another magnetic material. The first insulation layer 53 is then formed by lithography using a resist material or another organic resinous material. Subsequently, the resist material slopes, due to its comparatively high viscosity, through heat applied in a heating step for curing the resist material, and thus the first sloping region 53b extending from the first apex 53a is formed (FIG. 17A).

Next, the coil layer 54 helical in plane is formed on the first insulation layer 53, by plating with, for example, Cu (FIG. 17B). The second insulation layer 55 having the second sloping region 55b provided at the second apex 55a is formed on the first insulation layer 53, by photolithography using a resist material or another organic resinous material (FIG. 17C).

On the second insulation layer 55, the third insulation layer 56 having the third sloping region 56b extending upward from the third apex 56a is formed, by photolithography using a resist material or another organic resinous material (FIG. 17D). In the formation of the second and third insulation layers 55 and 56, the first, second and third sloping regions 53b, 55b and 56b are arranged nearly flush with one another to form the inclined plane K1 having the apex angle θ1.

The upper core layer 57 is then formed by frame plating. Initially, a thin film of a primary coat 58a of the same material with the upper core layer 57, i.e., an Fe—Ni alloy or another magnetic material, is formed on the second and third insulation layers 55 and 56, by sputtering or another vacuum film formation technique. A resist material is then coated onto the primary coat 58a to form a photoresist layer 58b (FIG. 17E). The upper core layer 57 is then patterned by exposing the photoresist layer 58b with light from above in the direction indicated by arrows (FIG. 17E), and a film of an Fe—Ni alloy or another magnetic material is plated on areas where the primary coat 58a is bared. The residual photoresist layer 58b and unnecessary areas of the primary coat 58a are removed to give the upper core layer 57. The top of the upper core layer 57 is covered by a protective film (not shown) of, for example, $Al_2O_3$.

Finally, unnecessary areas of the thin film laminate is removed, and the air bearing surface (ABS) A is formed by lapping, and the gap depth Gd is determined by a distance from the ABS A to the zero throat height Z to give a thin film magnetic head having the inductive head shown in FIG. 16A and 16B.

U.S. Pat. No. 5,621,596 discloses a technique directed to a thin film magnetic head having a shape controlled upper core layer and a production process thereof. According to the technique, a gap layer 62 of a nonmagnetic material is formed on a lower core layer 61 of a highly permeable material, and a first insulation layer 63 of a resist material or another organic resinous material having a first apex 63a is formed on the gap layer 62 (FIG. 19A). The first insulation layer 63 is formed thinner (thickness: 1.5 $\mu$m) than conventional equivalents. On the first insulation layer 63, a coil layer 64 of, for instance, Cu is formed helical in plane. A second insulation layer 65 of a resist material or another organic resinous material is laminated on the first insulation layer 63 so as to cover the coil layer 64. The second insulation layer 65 has a second apex 65a at a distance of 3 $\mu$m or more toward the ABS A from the first apex 63a, and a second sloping region 65b commencing from the second apex 65a. A third insulation layer 66 of a resist material or another organic resinous material is formed on top of the second insulation layer 65 in a region where the second insulation layer 65 overlies the coil layer 64. An upper core layer 67 of an Fe—Ni alloy (e.g., permalloy) or another magnetic material is formed by frame plating on top of the second and third insulation layers 65 and 66.

According to this technique, the second apex 65a establishes a zero throat height Z which defines a gap depth Gd, and the second sloping region 65b defines an apex angle θ2. A tip region 67a of the upper core layer 67 is formed on the gap layer 62 in the vicinity of the second apex 65a, and a pole straight Ps is provided on the second sloping region 65b.

In another embodiment of this technique as shown in FIG. 19B, where the second insulation layer 65 covers the coil layer 64, a third apex 66a and a third sloping region 66b define the zero throat height Z and an apex angle θ2, respectively. The tip region 67a of the upper core layer 67 is formed on top of the second gap layer 62 in the vicinity of the third apex 66a, and the pole straight Ps is provided on the third sloping region 66b.

According to this technique, the following advantages are to be expected: As the apex angle θ2 is defined only by the second sloping region 65b (FIG. 19A) or the third sloping region 66b (FIG. 19B), precision in position and angle is increased. In addition, the first insulation layer 63 is formed thinner than conventional equivalents, and the second or third insulation layer 65 or 66 is formed so that the second apex 65a (FIG. 19A) or the third apex 66a (FIG. 19B) is located at a distance of 3 $\mu$m or more from the first apex 63a at a distance of 10 $\mu$m or more from the commencement of the coil layer 64, thus defining the zero throat height Z. Accordingly, inclination of the top slope in the vicinity of the second apex 65a (FIG. 19A) or the third apex 66a (FIG. 19B) is reduced and the thickness of a photoresist layer (not shown) for patterning the upper core layer 67 is made more uniform, resulting in precise formation of the tip region of the upper core layer 67 by frame plating. Further, as the inclination of the top slope in the vicinity of the second apex 65a (FIG. 19A) or the third apex 66a (FIG. 19B) is reduced, no light will be reflected from the top slope into the tip region 67a and connecting portion 67b, when the body portion 67c is exposed to light for patterning, resulting in the formation of shape controlled upper core layer 67 with high precision. In addition, there is no need of moving the pole straight Ps rearwardly which connects between the connecting portion 67b and the body portion 67c, and thus a thin film magnetic head having high overwrite property can be obtained.

FIGS. 20A and 20B are illustrations of a conventional thin film magnetic head having a plurality of coil layers, in which FIG. 20A is a cross sectional view of its substantial part, and FIG. 20B is a top view of its upper core layer. FIGS. 21A through 21D are cross sectional views of the steps involved in producing the above conventional thin film magnetic head. FIGS. 21A and 21B are cross sectional views of the substantial part of one step of the above production process, in which FIG. 22A is a cross sectional view where a photoresist layer for frame plating is formed, and FIG. 22B is a cross sectional view illustrating the reflection in the light exposure on the photoresist layer.

An inductive write head for writing magnetic signals on a recording medium such as a hard disk is laminated on a magnetoresistive read head (MR read head) the magnetic signals on a trailing edge of a slider of a floating type magnetic head facing to the magnetic recording medium, thus constituting a composite thin film magnetic head.

In the thin film magnetic head shown in FIG. 20A, a lower core layer 51 of an inductive write head also serves as an upper shield layer of an MR read head 20, and is composed of an Fe—Ni alloy (e.g., permalloy) or another highly permeable material. A gap layer 52 of $Al_2O_3$ or another nonmagnetic material is formed to a thickness of Gl on the lower core layer 51.

A first insulation layer 53 of a resist material or another organic resinous material is formed on the gap layer 52 and is provided with a first apex 53a, a first sloping region 53b extending upward from the first apex 53a with respect to the top of the gap layer 52, and a first plane region 53c being connected to the first sloping region 53b and having a top nearly parallel to the top of the gap layer 52. A first coil layer 54 of copper (Cu) or another low-resistance conductive material helical in plane is formed on top of the first plane region 53c. A second insulation layer 55 of a resist material or another organic resinous material is formed on top of the first insulation layer 53 so as to cover the first coil layer 54. The second insulation layer 55 is provided with a second apex 55a, a second sloping region 55b extending upward from the second apex 55a, and a second plane region 55c being connected to the second sloping region 55b and having a top nearly parallel to the top of the gap layer 52. The second apex 55a is located on the first sloping region 53b, and the second sloping region 55b is arranged nearly flush with the first sloping region 53b.

A second coil layer 56' of, for instance, copper (Cu) helical in plane is formed on the second plane region 55c, and a third insulation layer 57' of a resist material or another organic resinous material is formed on the second insulation layer 55 so as to cover the second coil layer 56', and is provided with a third apex 57'a, a third sloping region 57'b extending upward from the third apex 57'a, and a third plane region 57'c being connected to the third sloping region 57'b and having a top nearly parallel to the top of the gap layer 52. The third apex 57'a is located on the second sloping region 55b, and the third sloping region 57'b is arranged nearly flush with the second sloping region 55b.

An upper core layer 58' of an Fe—Ni alloy (e.g., permalloy) or another magnetic material is formed on top of the first, second and third insulation layers 53, 55 and 57', and the gap layer 52, and is provided with a tip region 58'a, a connecting portion 58'b, a body portion 58'c and a back end region 58'd (FIG. 20B). The tip region 58'a is located on a surface facing a magnetic recording medium, is connected via the gap layer 52 to the lower core layer 51, and has a narrow track width Tw; the connecting portion 58'b is connected to the tip region 58'a in a nearly identical width, and is formed on the first, second and third sloping region 53b, 55b and 57'b; the body portion 58'c extends wider from the connecting portion 58'b and covers part of the first and second coil layers 54 and 56'; and the back end region 58'd is magnetically connected via a hole H to the lower core layer 51 and is wrapped with the first and second coil layers 54 and 56' therearound. The hole H is formed in the gap layer 52 and the first insulation layer 53 in a position which is nearly the center of the coil layer 54. A connecting region (base region) between the connecting portion 58'b and the body portion 58'c is called pole straight Ps. In this connection, the first and second coil layers 54 and 56' are formed rounding the back end region 58'd, and only part of these layers are illustrated in FIG. 20A.

A distance between the lower core layer 51 and the tip region 58'a (i.e., the thickness of the gap layer 52) determines the gap length Gl of a magnetic gap G, and a depth of the tip region 58'a, that is, a distance between the air bearing surface (ABS) A which faces the magnetic recording medium and the first apex 53a determines a gap depth Gd. The lower core layer 57' in such a composite thin film magnetic head also serves as an upper shield layer of the MR head, and is formed wider than the tip region 57'a of the upper core layer 57'. Accordingly, the track width Tw is determined by the width of the tip region 58'a.

The inductive head having a dual coil layer structure composed of the first and second coil layers 54 and 56' of the conventional thin film magnetic head is thus configured. A recording current is applied to the first and second coil layers 54 and 56', and a recording magnetic field is induced to the lower and upper core layers 51 and 58', and magnetic signals are recorded on a magnetic recording medium through a leakage magnetic field, in the air bearing surface (ABS) A, from the magnetic gap G between the lower core layer 51 and the tip region 58'a of the upper core layer 58'. By configuring the coil layer to have dual layer structure as is described above, a magnetic path can be shortened to improve efficiency in writing, to increase recording density, and to reduce inductance. Such a magnetic head thus obtained is adaptable to recording of high-frequency magnetic signals.

Next, a production process of the above conventional thin film magnetic head will be described. Initially, the gap layer 52 of $Al_2O_3$ or another nonmagnetic material is formed to a thickness (gap length) of Gl on the lower core layer 51, which is composed of an Fe—Ni alloy or another magnetic material. The first insulation layer 53 is then formed by lithography using a resist material or another organic resinous material. Subsequently, the resist slopes, due to its comparatively high viscosity, through heat applied in a heating step for curing the resist material and thus the first sloping region 53b and the first plane region 53c are formed extending from the first apex 53a (FIG. 21A), which first plane region 53c has a top nearly parallel to the top of the gap layer 52. Separately, the hole H for connecting the upper core layer 58' to the lower core layer 51 is formed by etching or another technique, which core layer 58' will be formed in later steps.

Next, the first coil layer 54 is formed helical in plane on the first plane region 53c, by plating with, for example, Cu (FIG. 21B). The second insulation layer 55 is then formed on the first insulation layer 53 so as to cover the first coil layer 54, by applying a resist material or another organic resinous material and subjecting the coated layer to photolithography (FIG. 21C). In this step, the second sloping region 55b extending from the second apex 55a is formed, and an upper area of the second insulation layer 55 constitutes the second plane region 55c nearly parallel to the top of the gap layer 52, as in the first insulation layer 53. The second apex 55a is located on the first sloping region 53b, and the second sloping region 55b is arranged nearly flush with the first sloping region 53b.

On the second plane region 55c, the second coil layer 54 helical in plane is formed by plating with, for example, Cu. The third insulation layer 57' is formed on the second insulation layer 55 so as to cover the second coil layer 56', by photolithography using a resist material or another organic resinous material (FIG. 21D). In this step, the third sloping region 57'b is formed extending upward from the third apex 57'a, and the top of the third insulation layer establishes the third plane region 57'c nearly parallel to the top of the gap layer 52, as in the second insulation layer 55. The third apex 57'a is located on the second sloping region 55b, and the third sloping region 57'b is arranged nearly flush with the second sloping region 55b.

The upper core layer 58' is then formed by frame plating. Initially, a thin film of a primary coat 59 of the same material with the upper core layer 58', i.e., an Fe—Ni alloy or another magnetic material (conductive material), is formed at least over the first, second and third insulation layers 53, 55 and 57' and the gap layer 52, by sputtering or another vacuum film formation technique. A resist material is then spin coated onto the primary layer 59 to form a photoresist layer 60 (FIG. 22A). The upper core layer 58 is then patterned by exposing the photoresist layer 60 with light from above in the direction indicated by arrows in FIG. 22E, and is developed to remove exposed areas of the photoresist layer 60. A film of an Fe—Ni alloy or another magnetic material is then plated on areas where the primary coat 59 is bared. The residual photoresist layer 60 and the unnecessary part of the primary coat 59 are removed to give the upper core layer 58'. The top of the upper core layer 58' is covered by a protective film (not shown) of, for example, $Al_2O_3$.

Finally, unnecessary portion of the thin film laminate is removed, and the air bearing surface (ABS) A is formed by lapping, and the gap depth Gd is determined by a distance from the ABS A to the first apex 53a to give a thin film magnetic head having the inductive head shown in FIGS. 20A and 20B. In this connection, the primary coat 59 is integrated with the upper core layer 58', and is not shown in FIGS. 20A and 20B.

In the conventional thin film magnetic head and its production process shown in FIGS. 16A and 16B, 17A–17E, 18A and 18B, the apex angle θ1 of the inclined plane K1 constituted by the first, second and third sloping regions 53b, 55b and 56b depends on the positions of the first, second and third apexes 53a, 55a and 56a. The second and third apexes 55a and 56a should therefore be positioned with high precision with respect to the first apex 53a in their formation. Thus, this technique is very complicated.

The apex angle θ1 is comparatively large in the conventional thin film magnetic head, and a resist material coated in the production process is liable to flow downward. The photoresist layer 58b for the formation of the upper core layer 57 by frame plating becomes thinner in the vicinity of the third sloping region 56b. Accordingly, when the photoresist layer 58b is exposed and developed to form the upper core layer 57 from an Fe—Ni alloy or another magnetic material by frame plating, the magnetic material overflows the photoresist layer 58b in the vicinity of the third apex 56a to form an overhang. Thus, the body portion 57c of the upper core layer 57 having desired dimensions cannot be obtained.

Furthermore, as the photoresist layer 58b becomes thicker in the vicinity of the first apex 53a, a focal depth should be deepened or increased in the light exposure step of the photoresist layer 58b for patterning the upper core layer 57 to ensure the tip region 57a and the connecting portion 57b to be patterned with reliability. Such a deep focal depth, however, deteriorates the definition (resolution), and the tip region 57a and the connecting portion 57b cannot be patterned in the vicinity of the first apex 53a with high precision. In particular, a track density increases in recent years with an increasing recording density of magnetic recording media, rendering the size of the tip region 57a in the track width Tw direction to be 1 μm or less. The formation of a target track width Tw controlled with high precision becomes harder and harder.

In patterning of the upper core layer 57 by exposing the photoresist layer 58b with the light, part of exposure light incited from above penetrates the photoresist layer 58b, and is then reflected or diffused on the surface of the primary coat 58a on the inclined plane K1 to expose other areas in addition to the patterned area for the upper core layer 57 (FIG. 18A). Particularly, in a magnetic head having an apex angle θ1 of 60° or more, the light for patterning the body portion 57c of the upper core layer 57 is liable to be reflected on the surface of the primary coat 58a into the tip region 57a. As a result, the pattern of the upper core layer 57 as indicated by a solid line cannot be formed, and, on the contrary, the body portion 57c protrudes toward the tip region 57a and the pole straight Ps is located nearer toward the tip region 57a as indicated by dashed lines (FIG. 18B). Therefore, the photoresist layer is exposed with a broadened track width Tw of the tip region 57a and the connecting portion 57b. A solution to the reflection problem is to move the pole straight Ps toward the back end region (not shown) in order not to affect the track width Tw of the tip region 57a and the connecting portion 57b in the light exposure step of the photoresist layer 58b.

However, moving the pole straight Ps rearwardly extends the length (pole straight length) P1 from the ABS A to the pole straight Ps longer than the size of the tip region 57a in a direction of the track width Tw, resulting in a reduced flux density at the tip region 57a, which deteriorates the overwrite property of the magnetic head. The over write property is defined in the following manner: When a record is recorded at a low frequency and then overwritten at a high frequency, the degree of decrease of the after-power at this stage of a signal recorded at a low frequency from the output of a signal recorded at low frequency before overwriting at a high frequency defines the overwrite property. The overwrite property is known to be decreased with an increasing pole straight length P1.

According to the conventional thin film magnetic head and the production process thereof, as thus described, the size and shape of the upper core layer 57 is hardly controlled, and a high recording density in magnetic recording media cannot be achieved.

Separately, in the thin film magnetic head shown in FIGS. 19A and 19B and disclosed in the U.S. Pat. No. 5,621,596, the apex angle θ2 depends on the thickness of the second or third insulation layer 65 or 66, or on the viscosity or other characteristics of the constitutive material thereof such as the resist material or organic resinous material. Therefore, once the material having desired characteristics is selected and the thickness of the second insulation layer 65 (FIG. 19A) or third insulation layer 66 (FIG. 19B) is determined, the apex angle θ2 is nearly uniquely defined. The apex angle thus defined is hardly changed, which deteriorates the degree of freedom in design of the magnetic head.

The second insulation layer 65 (FIG. 19A) or third insulation layer 66 (FIG. 19B) is formed by application of a resist material or another organic resinous material after the formation of the coil layer 64. The coil layer 64 helical in plane makes a surface to be coated with the material for the second or third insulation uneven, which causes distribution in thickness (unevenness of the surface of the insulation layer) of the formed insulation layer, resulting in deteriorated precision in registration of the zero throat height Z. A solution to the unevenness in thickness of the second or third insulation layer 65 or 66 due to the thickness of the coil layer 64 is to flat and thin the coil layer 64 more than the conventional coil layer 54. The thinned and flatted coil layer 64 increases the overall surface area of the coil layer 64 at the same number of turns with that of the conventional equivalent, and elongates the magnetic path of the upper core layer 67, resulting in an increased inductance and deteriorated high frequency property.

With present day demands for storing and processing a large amounts of data at high density on a magnetic recording medium such as a hard disk, there is a strong felt need for a thin film magnetic head which provides both high recording and processing property and narrow track width. To be more specific, there is a strong need for a thin film magnetic head having a plurality of coil layers as shown in FIGS. 20A and 20B with narrower track width Tw which is defined by the width of the tip region 58'a of the upper core layer 58'. For this purpose, the photoresist layer 60 in an area to be the vicinity of the tip region 58a should be patterned with a particularly high precision.

As the conventional thin film magnetic head shown in FIGS. 20A and 20B, however, has a dual coil layer structure composed of the first and second coil layers 54 and 56, the first, second and third insulation layers 53, 55, and 57' covering these coil layers have a large overall thickness, and the first, second and third sloping region 53b, 55b, and 57'b formed nearly flush with one another slope upward steeply. When a resist material is spin coated onto the insulation layers for the formation of the photoresist layer 60, which is in turn used for the formation of the upper core layer 58' by frame plating, the resist material is liable to flow downwards and thereby to have a larger thickness t1 on the gap layer 52 in the vicinity of the first apex 53a, and a smaller thickness t2 on the top of the third insulation layer 57' where the body portion 58'c is to be formed (FIG. 22A). The thickness t1 in the lower side increases with an increasing viscosity of the resist material, and it will be about 9 to 10 μm when a resist material having a viscosity of about 800 centipoises (cp) is used. The thickness t1 of the photoresist layer 60 is very large, in comparison with that of the upper core layer 58' to be formed, i.e., about 1 to 2 μm. With such a large thickness t1, the focal depth of an exposure light source in the photolithography step should be increased or deepened, but such an increased focal depth deteriorates the definition (resolution). As a result, the tip region 58'a would not be patterned on the photoresist layer 60 in the vicinity of the first apex 53a with precision, and the tip region 58'a having the desired narrow track width Tw cannot be obtained.

A possible solution to the above problem is to form the photoresist layer 60 with the use of a resist material having a lower viscosity. For example, when a resist material having a viscosity of about 300 cp is used, the thickness t1 on the lower side is reduced to about 6 to 7 μm as indicated by dashed lines in FIG. 22A. However, the thickness t2 on the upper side of the photoresist layer 60 is also reduced to about 1 μm or less, and when the frame plating is conducted using this area of the photoresist layer 60 as a frame for patterning the upper core layer 58 , the plating material (e.g., permalloy) overflows and leaks into the surroundings, which inhibits satisfactory control of the shape of the upper core layer 58'.

Furthermore, the first, second and third sloping region 53b, 55b and 57'b slope upward steeply in the conventional thin film magnetic head, and in patterning of the upper core layer 58' by exposing the photoresist layer 60 with the light, part of exposure light incited from above penetrates the photoresist layer 60 and then is reflected or diffused on the surface of the primary coat 59 to expose other areas in addition to the patterned areas for patterning the upper core layer 58' (FIG. 22B). Particularly, in a magnetic head having an apex angle of 45° or more in the first, second and third sloping region 53b, 55b and 57'b, the light for patterning the body portion 58'c of the upper core layer 58' is liable to be reflected on the surface of the primary coat 59 into the tip region 58'a. As a result, the pattern of the upper core layer 58' as indicated by the solid line cannot be obtained, and, on the contrary, the body portion 58'c protrudes toward the tip region 58'a as indicated by dashed lines (FIG. 20B). Therefore, the photoresist layer is exposed with a broadened track width Tw of the tip region 58'a and the connecting portion 5b, resulting in patterning with a deteriorated precision.

SUMMARY OF THE INVENTION

Accordingly, an object of the present invention is to provide a thin film magnetic head having an upper core layer having dimensions controlled with high precision, which can yield high density recording on a magnetic recording medium, and a production process of the same.

The invention provides, in an aspect, a thin film magnetic head including: a lower core layer of a magnetic material; a gap layer of a nonmagnetic material formed on top of the lower core layer; a first insulation layer formed on top of the gap layer and having a first apex, the first apex being located on a surface facing a magnetic recording medium and defining a gap depth; a coil layer formed on the first insulation layer and being located at a first predetermined distance from the first apex; a second insulation layer laminated on the first insulation layer so as to cover the coil layer, the second insulation layer having a second apex, the second apex being located on the surface facing the magnetic recording medium at a second predetermined distance from the first apex; a third insulation layer formed on the first insulation layer in a bared area between the first and second apexes, the third insulation layer having an inclined plane sloping at a predetermined angle with respect to the top of the gap layer; and an upper core layer of a magnetic material having a tip region, a connecting portion and a body portion, the tip region being located on a surface facing the magnetic recording medium and establishing a magnetic gap via the gap layer, the body portion being formed on top of the second and third insulation layers and having a back end region being in contact with the lower core layer, and the connecting portion connecting between the tip region and the body portion, and being formed on top of the first and third insulation layers.

In the above thin film magnetic head, the predetermined angle of the inclined plane may preferably be in the range of 15° to 50°.

The invention is also directed to a process for the production of a thin film magnetic head, the process including the steps of: forming a lower core layer from a magnetic material; forming a gap layer from a nonmagnetic material on top of the lower core layer; forming a first insulation layer on top of the gap layer, the first insulation layer having a first apex, the first apex being located on a surface facing a magnetic recording medium and defining a gap depth; forming a coil layer on top of the first insulation layer at a first predetermined distance from the first apex; forming a second insulation layer on top of the first insulation layer so as to cover the coil layer, the second insulation layer having a second apex, the second apex being located on a surface facing the magnetic recording medium at a second predetermined distance from the first apex; forming a third insulation layer on top of the first insulation layer in an area bared between the first and second apexes, the third insulation layer having an inclined plane sloping at a predetermined angle with respect to the top of the gap layer; and forming an upper core layer having a tip region, a connecting portion and a body portion from a magnetic material, the tip region being located on top of the gap layer on a surface facing the magnetic recording medium, the body portion being located on top of the second and third insulation layers with its back end region being in contact with the lower core layer, and the connecting portion connecting between the tip region and the body portion, and being located on the first and third insulation layers.

In the above process, the predetermined angle of the sloping region may preferably be in the range from 15° to 50°.

Preferably, the upper core layer in the above process may be formed by the steps of: forming a primary coat from a magnetic material on top of the gap layer and the first, second and third insulation layers; forming a photoresist layer on top of the primary coat ;patterning the upper core layer by exposing the photoresist layer with light from above; removing exposed patterned areas of the photoresist layer; and forming the upper core layer from the magnetic material by frame plating using the photoresist layer.

The invention provides, in another aspect, a thin film magnetic head including: a lower core layer of a magnetic material; a gap layer of a nonmagnetic material formed on top of the lower core layer; a first insulation layer formed on top of the gap and having a first apex, a first sloping region and a first plane region, the first apex being located on a surface facing a magnetic recording medium and defining a gap depth, the first sloping region extending upward from the first apex, and the first plane region being connected to the first sloping region and being nearly parallel to the top of the gap layer; a first coil layer formed on top of the first plane region of the first insulation layer; a second insulation layer laminated on the first insulation layer so as to cover the first coil layer, the second insulation layer having a second apex, a second sloping region and a second plane region, the second apex being located on a surface facing the magnetic recording medium, the second sloping region extending upward from the second apex, and the second plane region being connected to the second sloping region and being nearly parallel to the gap layer; a second coil layer formed on top of the second plane region of the second insulation layer; a third insulation layer laminated on the second insulation layer so as to cover the second coil layer, the third insulation layer having a third apex and a third sloping region, the third apex being located on the second plane region on a surface facing the magnetic recording medium, and the third sloping region extending upward from the third apex; a first pocket region constituted by the second plane region and the third sloping region; and an upper core layer of a magnetic material formed on top of the gap layer and the first, second and third insulation layers, the upper core layer having a tip region and a back end region, the tip region being located on a surface facing to the magnetic recording medium, and establishing a magnetic gap via the gap layer, and the back end region being in contact with the lower core layer.

In the above-mentioned thin film magnetic head, the first pocket region is preferably filled with an insulative material to form a fourth insulation layer having a fourth sloping region.

Preferably, in the above thin film magnetic head, the second apex is formed on the first plane region, and a second pocket region is established by a bared area of the first plane region and the second sloping region.

In the aforementioned thin film magnetic head, the second pocket region is preferably filled with an insulative material to form a fifth insulation layer having a fifty sloping region.

The invention also relates to a process for the production of a thin film magnetic head, the process including the steps of: forming a lower core layer from a magnetic material; forming a gap layer from a nonmagnetic material on top of the lower core layer; forming a first insulation layer on top of the gap layer, the first insulation layer having a first apex, a first sloping region and a first plane region, the first apex being located on a surface facing a magnetic recording medium and defining a gap depth, the first sloping region extending upward from the first apex, and the first plane region being connected to the first sloping region and being nearly parallel to the top of the gap layer; forming a first coil layer on top of the first plane region of the first insulation layer; laminating a second insulation layer on top of the first insulation layer so as to cover the first coil layer, the second insulation layer having a second apex, a second sloping region and a second plane region, the second apex being located on a surface facing the magnetic recording medium, the second sloping region extending upward from the second apex, the second plane region being connected to the second sloping region and being nearly parallel to the top of the gap layer; forming a second coil layer on top of the second plane region of the second insulation layer; laminating a third insulation layer so as to cover the second coil layer, the third insulation layer having a third apex, a third sloping region and a third plane region, the third apex being located on the second plane region on a surface facing the magnetic recording medium, the third sloping region extending upward from the third apex, and the third plane region being connected to the third sloping region and being nearly parallel to the top of the gap layer; establishing a first pocket region by a bared area of the second plane region, and the third sloping region; forming a primary coat from a conductive material on top of the gap layer and the first, second and third insulation layers; forming a photoresist layer by coating a resist material onto the primary coat; patterning an upper core layer by photolithography of the photoresist layer; and forming a tip region and a body portion of the upper core layer from a magnetic material on top of the first, second and third insulation layer, the tip region being located on top of the gap layer, and the body portion being connected to the tip region and having a back end region being in contact with the lower core layer.

DESCRIPTION OF THE PREFERRED EMBODIMENTS

Figure 1A:
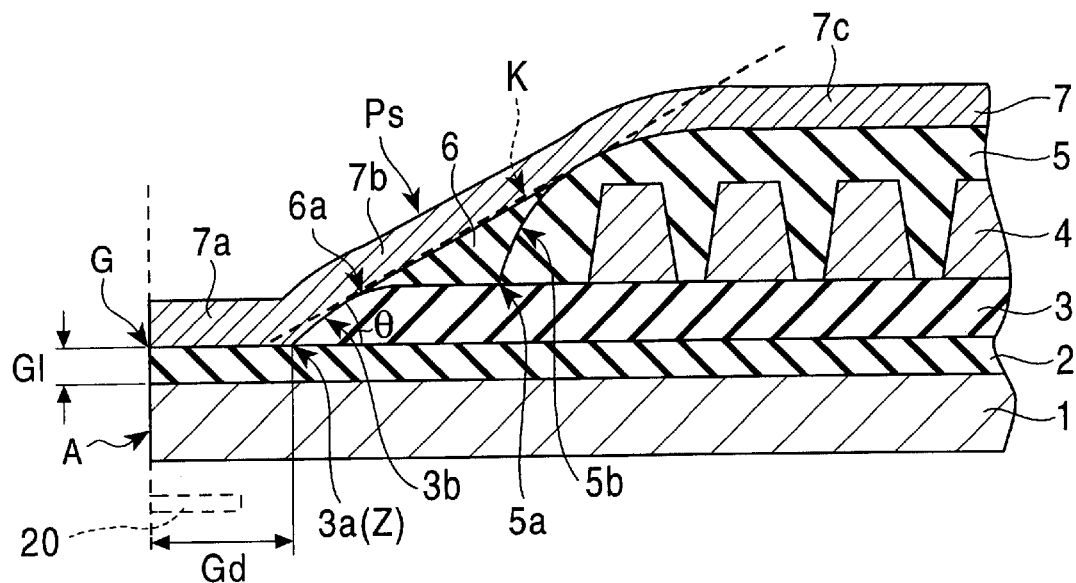
FIGS. 1A and 1B are illustrations of the inventive thin film magnetic head according to a first embodiment.
Figure 1B:
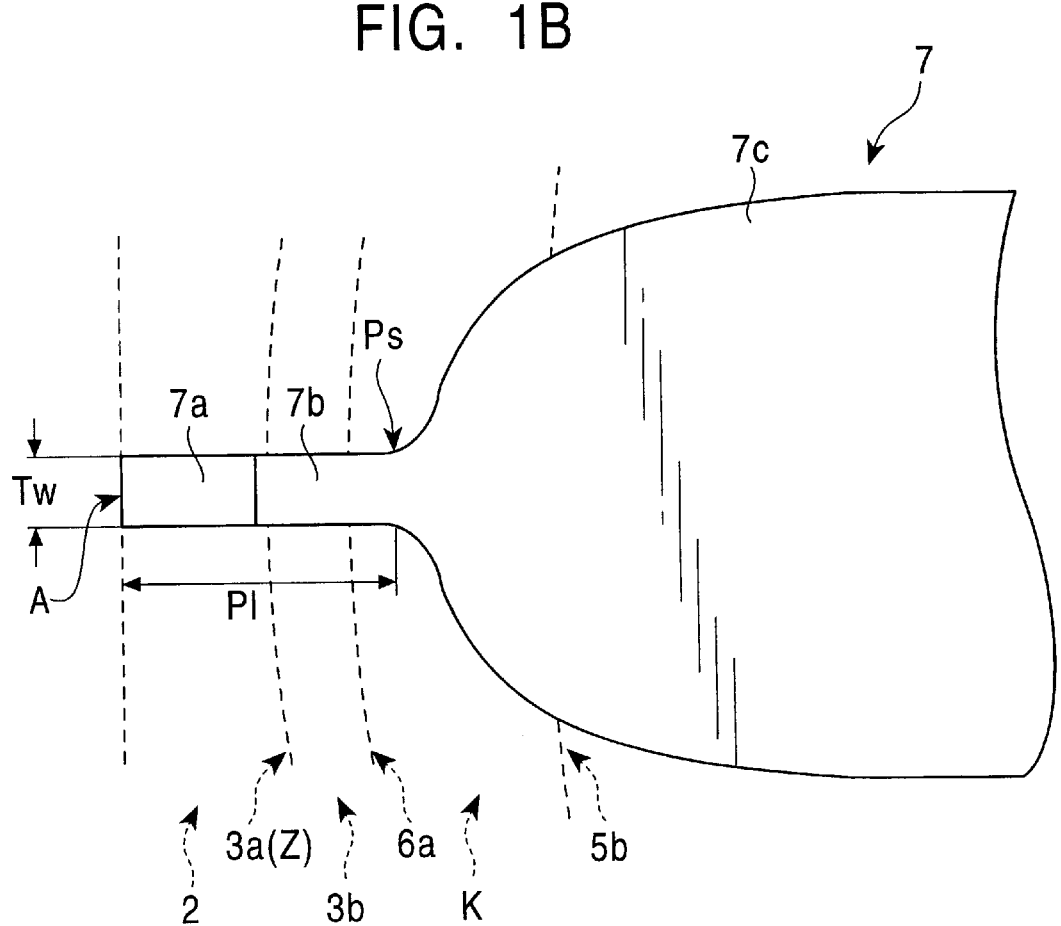
Figure 2A:
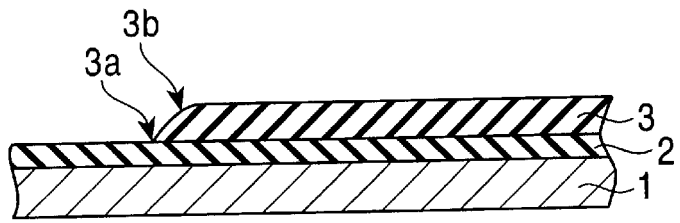
FIGS. 2A, 2B, 2C and 2D and FIGS. 3A, 3B, 3C and 3D are cross sectional views illustrating the steps involved in producing the above thin film magnetic head.
Figure 3A:
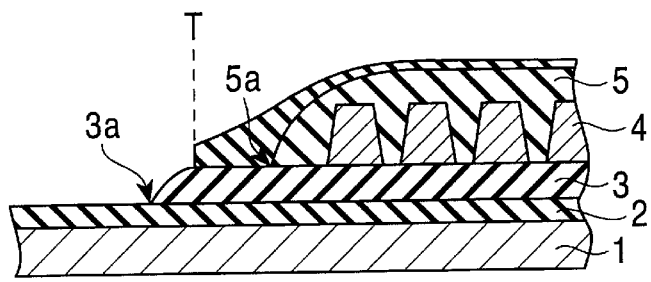
Figure 3B:
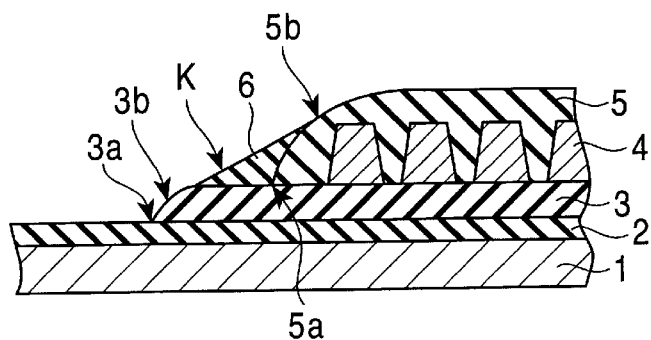
Figure 3C:
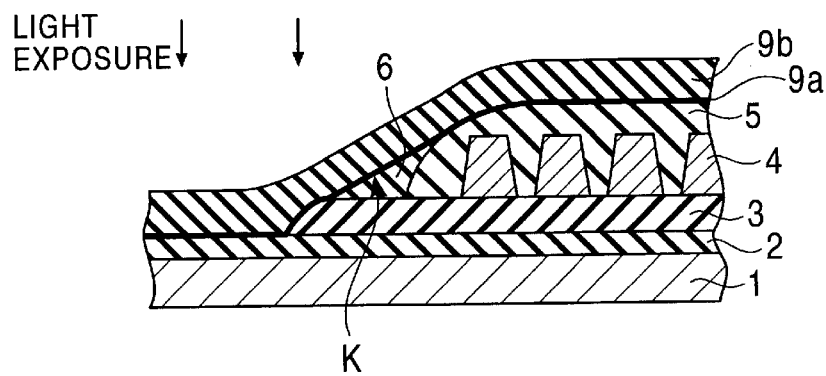
Figure 3D:
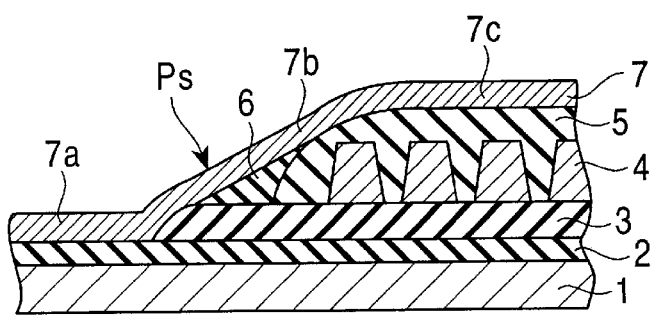
Figure 4A:
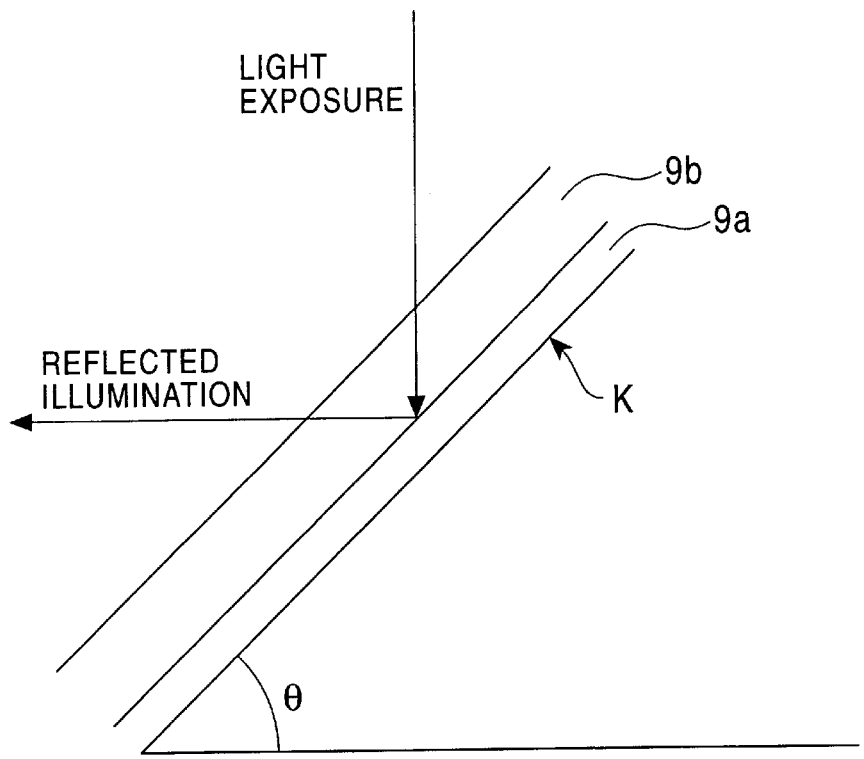
FIGS. 4A and 4B are illustrations of the process for the production of the present thin film magnetic head.
Figure 4B:
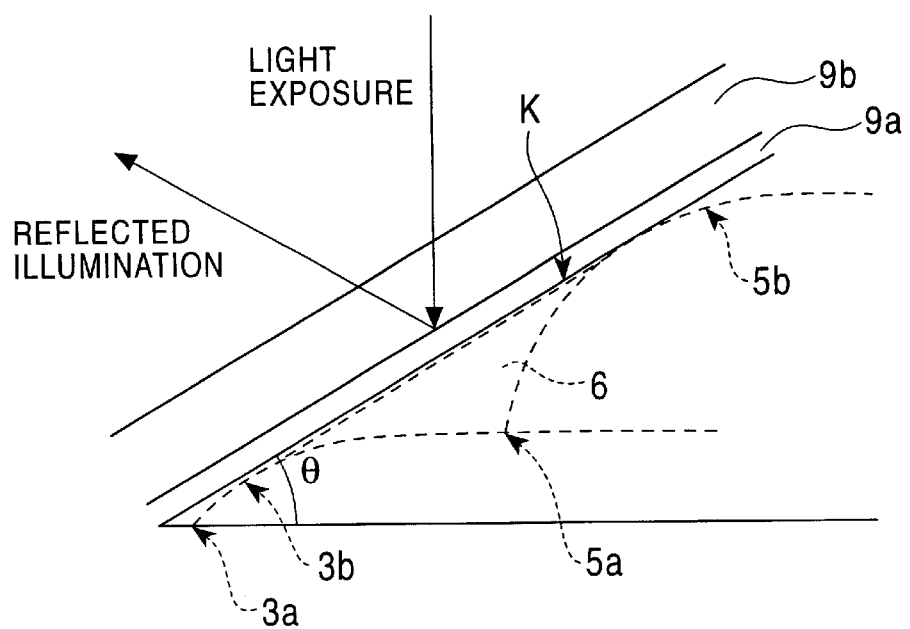
Figure 5:
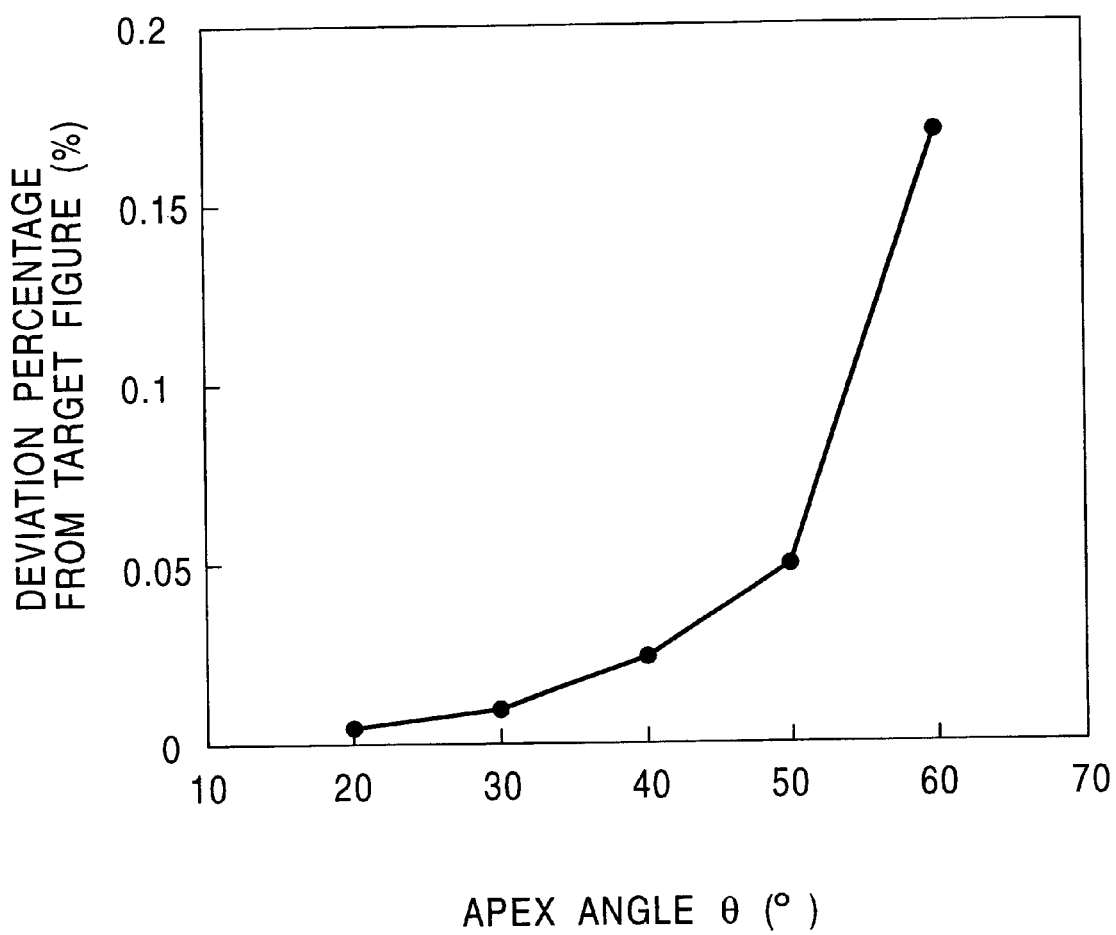
FIG. 5 is a graph showing the relationship between an apex angle and a deviation percentage from a target figure for illustrating the process for the production of the present thin film magnetic head.

Now, the preferred embodiments of the inventive thin film magnetic head and production processes thereof will be described with reference to the drawings. FIGS. 1A and 1B illustrate the inventive thin film magnetic head according to the first embodiment, in which FIG. 1A is a cross sectional view of its substantial part, and FIG. 1B is a top view of its upper core layer. FIGS. 2A–2D and 3A–3D are cross sectional views illustrating the steps of the production process of the thin film magnetic head according to the first embodiment. FIGS. 4A and 4B are illustrations of the aforementioned production process, which schematically illustrate the reflection behavior of light exposure in inclined planes at different angles in a photolithography step. FIG. 5 is a graph showing the relationship between an apex angle and a deviation percentage from a target figure for illustrating the process of producing the present thin film magnetic head.

First Embodiment

The inventive thin film magnetic head is a composite thin film magnetic head composed of an MR read head for reading magnetic signals with the aid of the magnetoresistive effect, and an inductive write head, laminated on the MR read head, for writing the magnetic signals on a magnetic recording medium such as a hard disk. In the present thin film magnetic head shown in FIG. 1A, a lower core layer 1 of the inductive write head also serves as an upper shield layer of an MR head having an MR read element 20, and is composed of an Fe—Ni alloy (e.g., permalloy) or another highly permeable material. A gap layer 2 of $Al_2O_3$ or another nonmagnetic material is formed to a thickness of Gl on the lower core layer 1. A first insulation layer 3 is formed from a resist material or another organic resinous material on the gap layer 2. The first insulation layer 3 has a first apex 3a and a first sloping region 3b, and the first apex 3a establishes a zero throat height z which, in turn, defines a gap depth Gd, and the first sloping region 3b extends from the first apex 3a and slopes upward with respect to the top of the gap layer 2. A coil layer 4 helical in plane of Cu or another low-resistance conductive material is formed on top of the first insulation layer 3 at a distance of 10 μm or more from the first apex 3a.

A second insulation layer 5 is formed from a resist material or another organic resinous material on top of the first insulation layer 3 so as to cover the coil layer 4, and has a second apex 5a and a second sloping region 5b extending upward from the second apex 5a. The second apex 5a is located on the first insulation layer 3 at a distance in the range of 6 μm to 10 μm from the first apex 3a, and the second insulation layer 5 over the coil layer 4 is arranged to have a sufficient thickness.

A third insulation layer 6 with a third apex 6a is formed from a resist material or another organic resinous material (e.g., a mixture of a novolak resin and a photosensitizer), and is located on the first insulation layer 3 in an area bared between the first apex 3a and the second apex 5a, and on the second sloping region 5b. The third apex 6a is located at a predetermined distance in the range of 0 μm to 4 μm from the first apex 3a, and has a smooth and continuous inclined plane K. The inclined plane K slopes upward at an angle of 45° or less with respect to the gap layer 2, and connects gently between an upper area of the first sloping region 3b and an upper area of the second sloping region 5b. The inclination angle just mentioned above establishes an apex angle θ.

An upper core layer 7 is formed from an Fe—Ni alloy (e.g., permalloy) or another magnetic material on top of the first, second, and third insulation layers 3, 5, and 6, and on top of the gap layer 2. The upper core layer 7 has a narrow tip region 7a, a connecting portion 7b, a body portion 7c and a back end region (not shown) (FIG. 1B), in which the tip region 7a is connected via the gap layer 2 to the lower core layer 1 on a surface facing to a magnetic recording medium; the connecting portion 7b is connected to the tip region 7a in a nearly identical width, and is located on a lower region of the first sloping region 3a and on the inclined plane K; the body portion 7c extends wider from the connecting portion 7b and covers part of the coil layer 4, and the back end region is magnetically connected to the lower core layer 1 through a hole, and is wrapped with the coil layer therearound, which hole is formed in the gap layer 2 and the first insulation 3 in a position nearly the center of the coil layer 4. A connecting region between the connecting portion 7b and the body portion 7c is called a pole straight Ps.

A magnetic gap G has a gap length Gl and a gap depth Gd, and the gap length Gl is determined by a distance between the lower core layer 1 and the tip region 7a connected via the gap layer 2, i.e., the thickness of the gap layer 2. The gap depth Gd is determined by a depth of the tip region 7a, i.e., a distance between an air bearing surface (ABS) A and the first apex 5a (zero throat height Z). The air bearing surface A is for facing the magnetic recording medium, and is shown in the left end in the figure. In a composite thin magnetic head, the lower core layer 1 also serves as an upper shield layer of the MR head, which width is therefore larger than that of the tip region 7a of the upper core layer 7. A track width Tw is therefore determined by the width of the tip region 7a.

In the inductive write head configured as above, a recording current is applied to the coil layer 4, and a recording magnetic field is induced to the lower and upper core layers 1 and 7, and magnetic signals are recorded on a magnetic recording medium through a leakage magnetic field, in the air bearing surface (ABS) A, from the magnetic gap G between the lower core layer 1 and the tip region 7a of the upper core layer 7.

The production process of the present thin film magnetic head will now be described. Initially, the gap layer 2 is formed from $Al_2O_3$ or another nonmagnetic material to a thickness (gap length) of Gl on the lower core layer 1 of an Fe—Ni alloy or another magnetic material. The first insulation layer 3 is then formed by lithography using a resist material or another organic resinous material. Subsequently, the resist material slopes because of its comparatively high viscosity through heat applied in a heating step for curing the resist material, and thus the first sloping region 3b extending from the first apex 3a is formed (FIG. 2A).

Figure 2B:
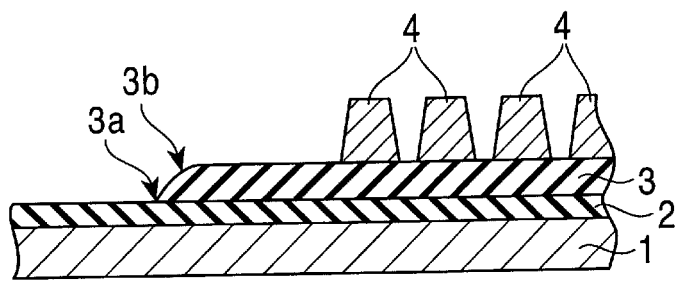

Next, the coil layer 4 is formed helical in plane on the first insulation layer 3, by plating with, for example, Cu (FIG. 2B).

Figure 2C:
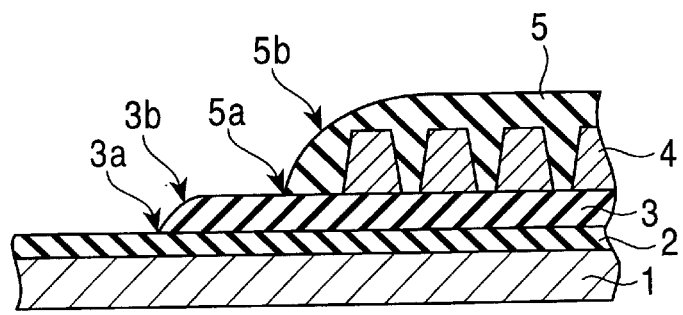

The second insulation layer 5 having the second sloping region 5b extending upward from the second apex 5a is formed on the first insulation layer 3 so as to cover the coil layer 4, by photolithography using a resist material or another organic resinous material (FIG. 2C). The second apex 5a is located at a predetermined distance from the first apex 3a, and the second insulation layer 5 over the coil layer 4 is set to have a sufficient thickness.

Figure 2D:
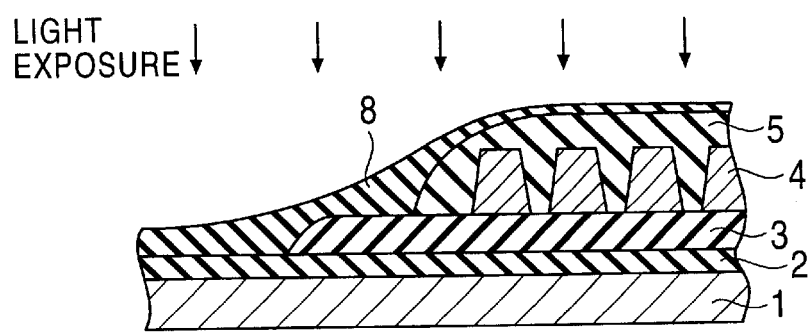

The third insulation layer 6 is then formed in the following manner: Initially, a photoresist layer 8 is formed from a thermosetting resist material or another organic resinous material on top of the gap layer 2, the first and second insulation layers 3 and 5 (FIG. 2D). In this step, the photoresist layer 8 should be formed very thin or not formed in an area over the coil layer 4. Next, the photoresist layer 8 is exposed with light and developed by photolithography for patterning, and is removed in areas over the first sloping region 3b downward from the line T and areas above the gap layer 2 (FIG. 3A). The photoresist layer is then gradually heated to reduce its volume by evaporating a solvent in the resist material, and is cured to form a shape shown in FIG. 3B. Thus, the third insulation layer 6 is formed on top of the first insulation layer 3 between the first and second apexes 3a and 5a, and on the second sloping region 5b. The third insulation layer 6 has the smooth and continuous inclined plane K (with the apex angle θ), which inclined plane K gently connects between an upper area of the first sloping region 3b and an upper area of the second sloping region 5b.

The upper core layer 7 is then formed by frame plating. Initially, a thin film of a primary coat 9a is formed from the same material (an Fe—Ni alloy or another magnetic material) with that of the upper core layer 7 on top of the first, second, and third insulation layers 3, 5 and 6. A resist material is then coated onto the primary coat 9a to form a photoresist layer 9b having a thickness somewhat larger than that of the target upper core layer 7 (FIG. 3C), and then it is exposed with light from above as indicated by the arrow in FIG. 3C for patterning the upper core layer 7, and the photoresist layer 9b in exposed areas is removed by a subsequent step of developing and dissolving the exposed photoresist. An Fe—Ni alloy or another magnetic material is then plated on the primary coat 9a in thus bared areas. The residual photoresist layer 9b is dissolved and the unnecessary primary coat 9a is removed to give the upper core layer 7. The top of the upper core layer 7 is covered with $Al_2O_3$ film or another protective film (not shown).

The upper core layer 7 has a narrow tip region 7a, a connecting portion 7b connected to the tip region 7a, and a body portion 7c connected to the connecting portion 7b. The tip region 7a is located on the gap layer 2 on a surface facing the magnetic recording medium, and the connecting portion 7b is formed in a lower area of the first sloping region 3b and on the inclined plane K. The pole straight Ps is located on the inclined plane K, and the body portion 7c is mainly located in an area on the second insulation layer 5 to cover part of the coil layer 4.

Finally, unnecessary area of the thin film laminate is removed, and the air bearing surface (ABS) A is formed by lapping, and the gap depth Gd is determined by a distance from the ABS A to the zero throat height Z to give a thin film magnetic head having the inductive head shown in FIG. 1A and 1B.

According to the above process, the third insulation layer 6 is formed on the first insulation layer 3 in a bared area between the first apex 3a and the second apex 5a, and on the second sloping region 5b, and has the smooth and continuous inclined plane K connecting gently between the first and second sloping regions 3b and 5b. By configuring like this, the inclination angle (apex angle) θ of the inclined plane K depends not on the viscosity or another characteristic of the material but on a positional relationship between the second and third apexes 5a and 6a, and therefore the apex angle can be set with facility. In addition, as the apex angle does not depend on the thickness or inclination angle of the first apex 3a which establishes the zero throat height Z, changes in thickness of the first insulation layer 3 hardly affects the apex angle, and the thickness of the first insulation layer 3 can freely be determined. Somewhat variation, if any, in the position of the second apex 5a with respect to the third apex 6a is negligible, because the third insulation layer 6 is formed on the second apex 5a. A somewhat low registration (precision) in the positional relationship between the second and third apexes 5a and 6a is therefore acceptable, resulting in facilitated setting of the apex angle θ.

As the apex angle θ can be controlled with facility, the thickness of the photoresist layer 9b for patterning the upper core layer 7 can be made more uniform by reducing the apex angle θ. To be more specific, the resist material becomes resistant to flow downward in the vicinity of the second sloping region 5b at such a low apex angle, and the photoresist layer 9b in an upper area of the second sloping region 5b can be thicker than conventional equivalents. Accordingly, the upper core layer 7 having a sufficient thickness and desired dimensions can be formed by frame plating. The photoresist layer 9b has a small thickness in the vicinity of the first apex 3a (zero throat height Z) because of a gentle sloping. Thus, there is no need of increasing the focal depth to retain high resolution, and the tip region 7a with a fine track width Tw can be formed with high precision, when the upper core layer 7 is patterned by exposing the photoresist layer 9 with light.

The easy control of the apex angle θ reduces influences of reflected exposure light in the formation of the upper core layer by means of decreasing the apex angle θ. To be more specific, by setting the apex angle θ, for example, to 45°, even if part of the light from above for exposure penetrates the photoresist layer 9 and is reflected on the surface of the primary coat 9a on the inclined plane K, the reflected illumination is directed to the horizontal direction in the figure (a direction parallel to the top of the lower core layer 1), but not into the tip region 7a and the connecting portion 7b (FIG. 4A). Thus, the upper core layer 7 can be patterned with reliability, the tip region 7a and the connecting portion 7b with a fine and narrow track width Tw can be formed. By setting the apex angle θ to less than 45°, more preferably to 30° or less, the exposure light is reflected upward to ensure patterning of the photoresist layer 9b to be controlled with more reliability (FIG. 4B). In addition, as the tip region 7a and connecting portion 7b can be patterned with more reliability, the pole straight is not required to be moved rewardly, if anything, the pole straight length P1 can be shortened to enhance the overwrite property.

The test results will be described below, of the relationship between the apex angle θ and the influence of reflected illumination in actual formation of the upper core layer 7. Initially, according to the aforementioned production process, the first, second and third insulation layers 3, 5 and 6 were formed in turn with varied apex angle θ, and the photoresist layer 9b was formed on these layers by coating. The upper core layer 7 was then patterned by light exposure of the photoresist layer 9b. In this step, the track width Tw of the tip region 7a was set to 1 μm in an area where the ABS A was bared. Exposed areas of the photoresist layer 9b were then removed, and a track width at the bottom of the tip region 7a in the resultant photoresist layer 9b in an area where the ABS A was bared, i.e., a track width of a resist frame, was measured by electron micrographic observation.

FIG. 5 shows the relationship between the apex angle θ and deviation percentages obtained by a difference between the measured track width of the resist frame and the target figure, 1 μm. FIG. 5 demonstrates that the deviation percentage from the target figure is abruptly increased at an apex angle exceeding 50°, and that the reflected illumination from light exposure affects and inhibits precise control of the track width of the resist frame for patterning of the tip region 7a and connecting portion 7b.

Contrary to this, at an apex angle θ of 50° or below, the deviation percentage from the target figure was small, resulting in a precisely controlled track width of the frame resist for the formation of the tip region 7a and connecting portion 7b. In an example shown in FIG. 4A, the apex angle θ is preferably set to 45° or below, but FIG. 5 indicates that the upper core layer 7 can be patterned with a satisfactory precision at an apex angle in the range of 45° to 50°. At an apex angle θ of 30° or below, the deviation percentage from the target figure was nearly 0°, indicating that the upper core layer 7 can be patterned with a very high precision without influences by the reflected illumination.

If the apex angle θ is extremely low, the first insulation layer 3 in the vicinity of the first sloping region 3b, and the first insulation layer 3 and third insulation layer 6 in the vicinity of a laminated area therebetween become thinner, resulting in a reduced distance between the connecting portion 7b of the upper core layer 7, and the lower core layer 1 directly therebelow, and inviting a leakage magnetic field from the connecting portion 7b to the lower core layer 1. Such a leakage magnetic field deteriorates the overwrite property. The more an absolute value of the overwrite property is, the more is preferred, and it is preferably 30 dB or more. When the upper core layer 7 was produced with varying the apex angle θ according to the above production process, and the overwrite property was measured, the obtained overwrite property was found to be 30 dB or more in a thin film magnetic head with an apex angle θ of 15° or more.

The zero throat height Z is defined by the first insulation layer 3 which is formed prior to the formation of the coil layer 4, the precision in registration of the zero throat height Z is increased without being affected by thickness distribution (unevenness on the surface of the insulation layers) due to the shape (protrusions and depressions) of the coil layer 4. In addition, the apex angle θ does not depend on the thickness of the second insulation layer 5 and is not established by the second sloping region 5b of the second insulation layer 5 for insulating the coil layer 4, and the thickness of the second insulation layer 5 can therefore be increased without thinning the coil layer 4. Thus, an overall area of the coil layer 4 can be maintained thin, resulting in a retained short magnetic path of the upper core layer 7 and high frequency property.

Other embodiments of the inventive thin film magnetic head and the production processes thereof will now be described below.

Figure 6A:
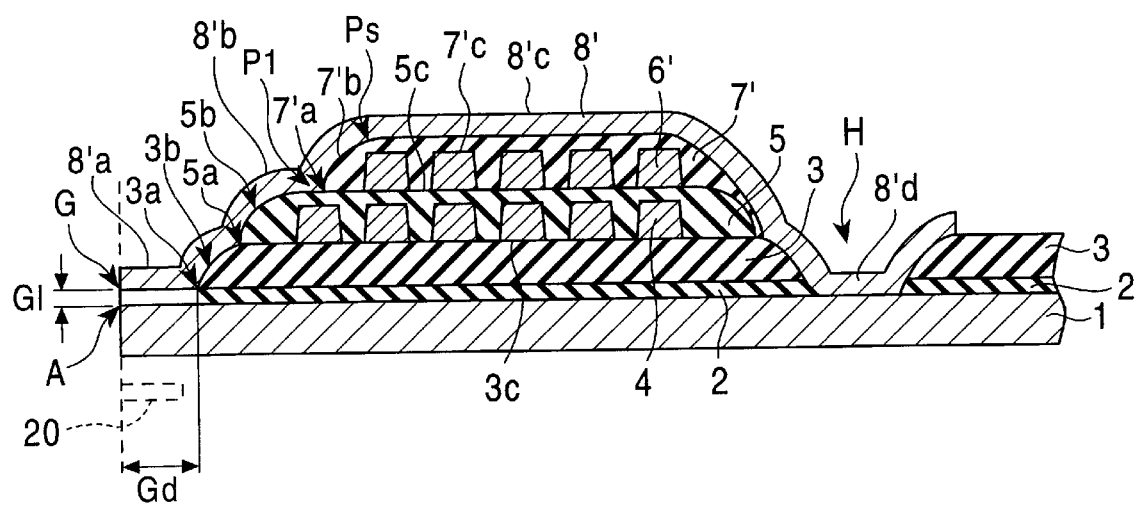
FIGS. 6A and 6B are illustrations of the inventive thin film magnetic head according to a second embodiment.
Figure 6B:
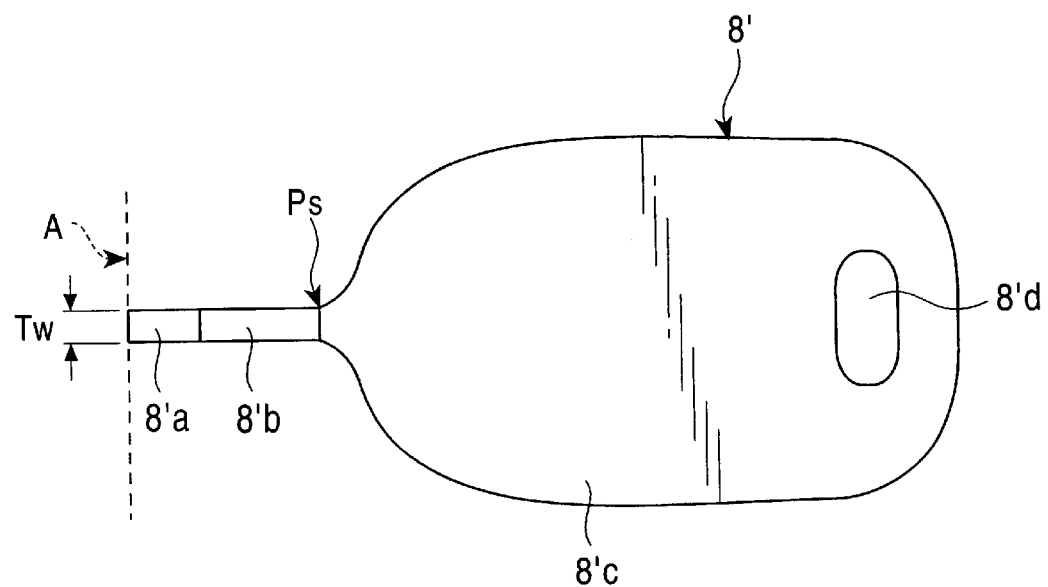
Figure 9:
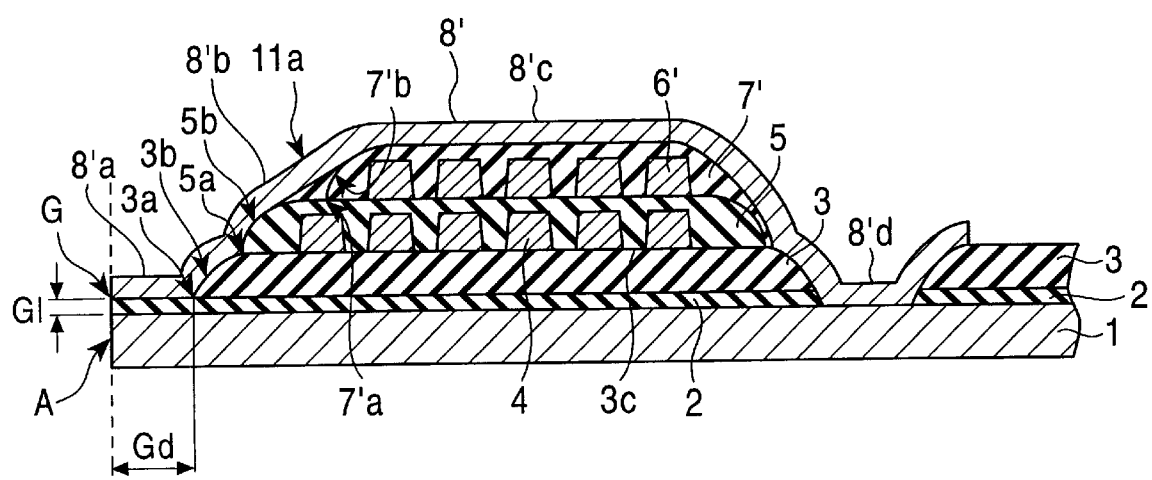
FIG. 9 is a cross sectional view showing a substantial part of the inventive thin film magnetic head according to a third embodiment.
Figure 10A:
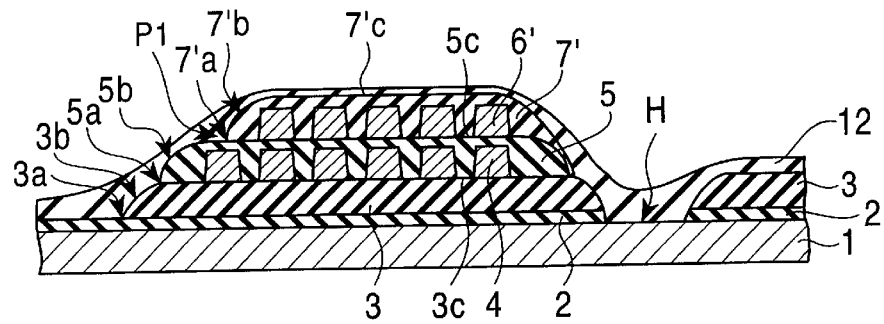
FIGS. 10A, 10B, 10C and 10D are cross sectional views showing the process for the production of the above thin film magnetic head.
Figure 10B:
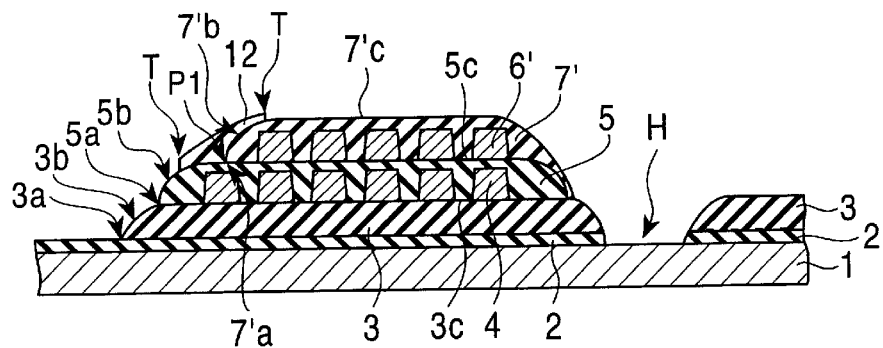
Figure 10C:
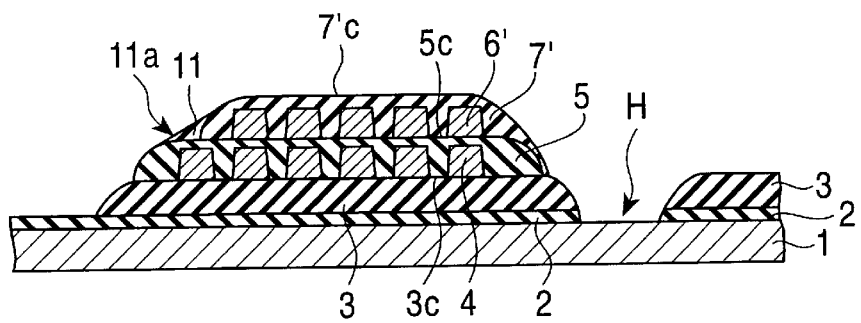
Figure 10D:
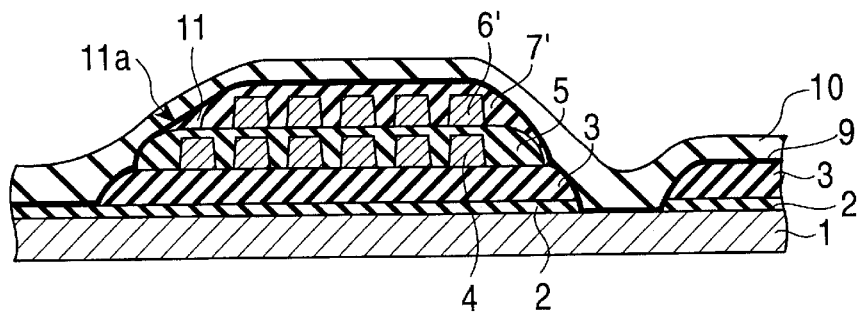
Figure 11:
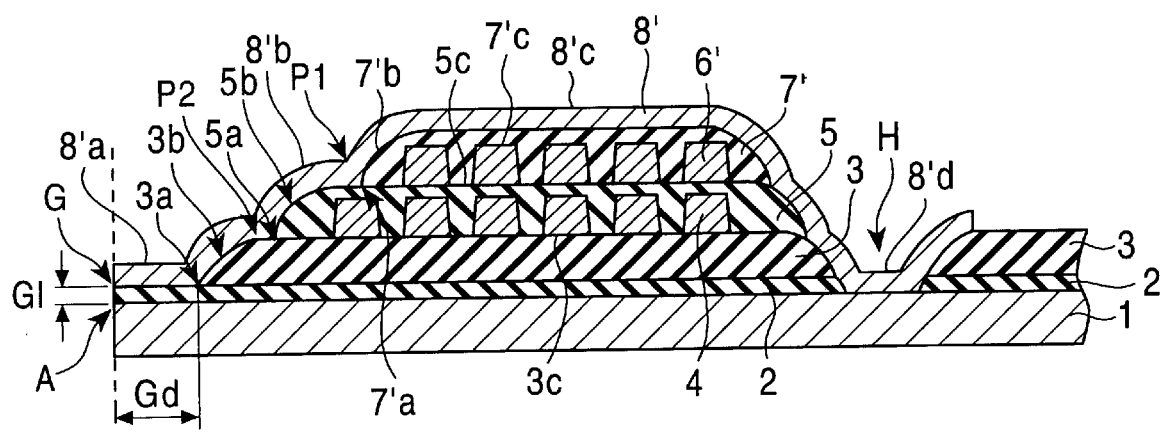
FIG. 11 is a cross sectional view of a substantial part of the inventive thin film magnetic head according to a fourth embodiment.
Figure 12A:
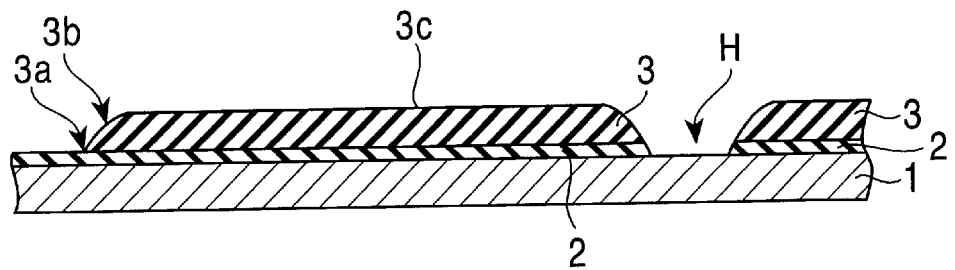
FIGS. 12A, 12B, 12C and 12D are cross sectional views illustrating the process for the production of the above thin film magnetic head.
Figure 13A:
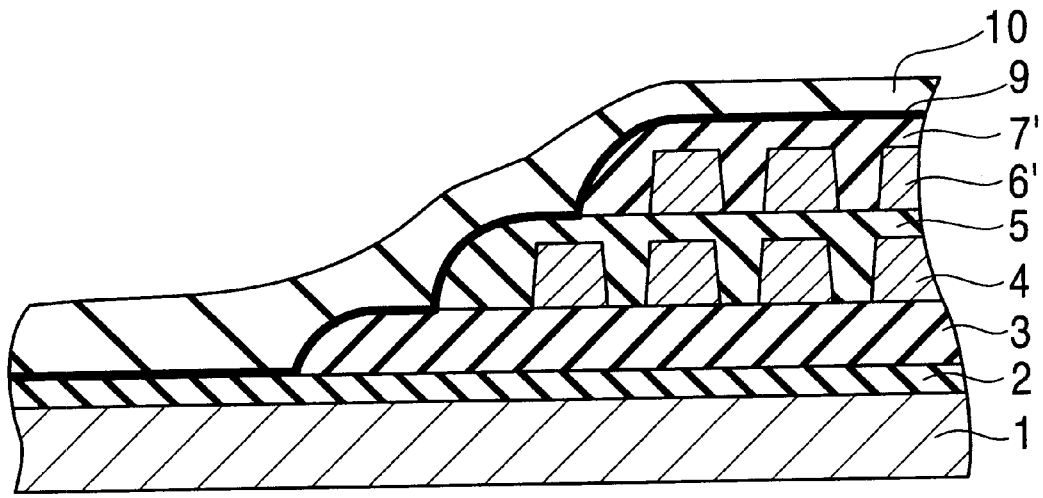
FIGS. 13A and 13B are cross sectional views showing a substantial part of a step of the above production process.
Figure 13B:
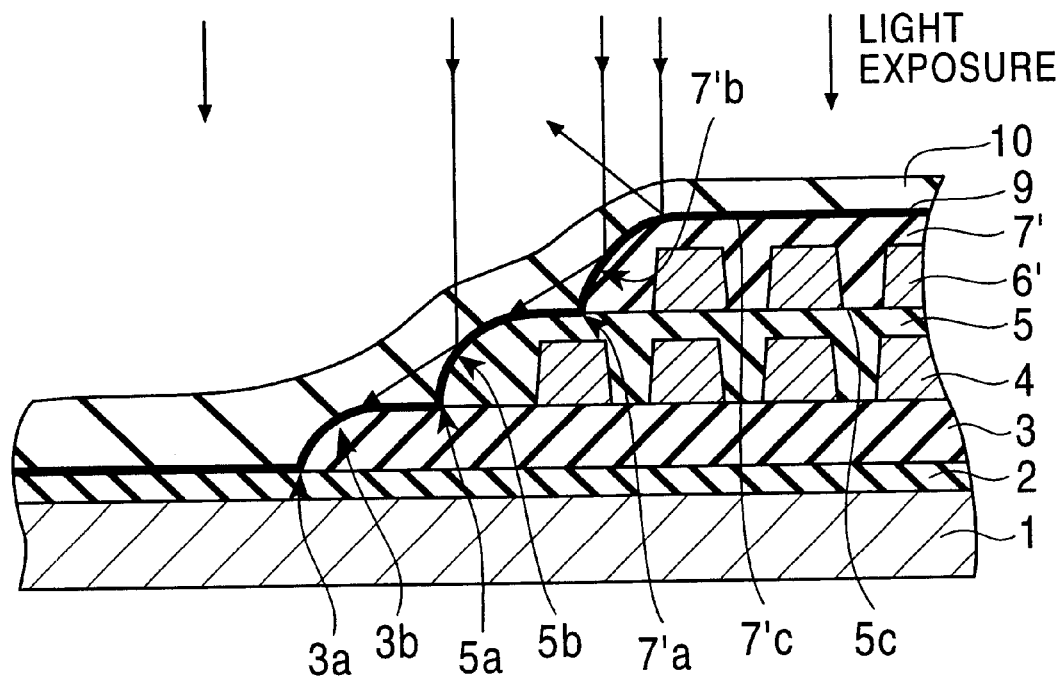
Figure 14:
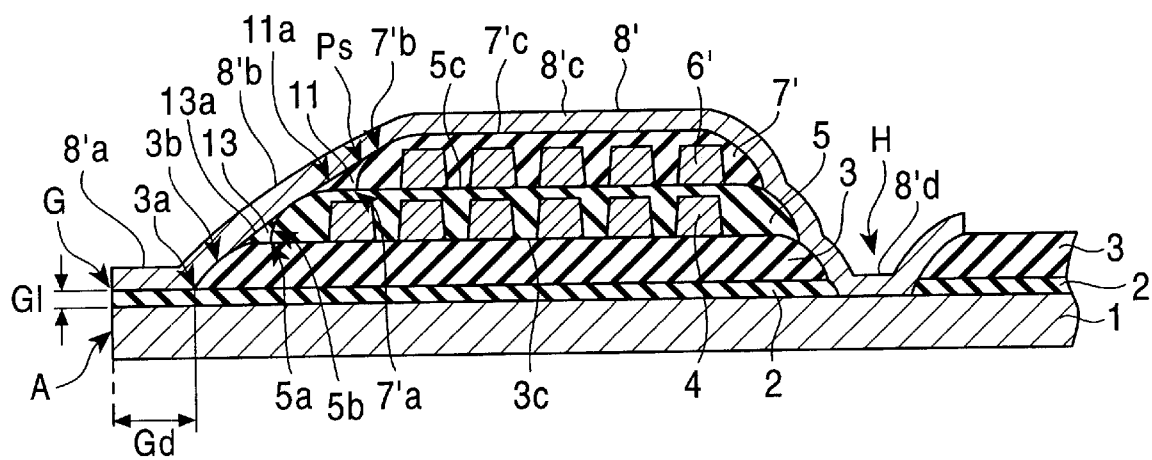
FIG. 14 is a cross sectional view of a substantial part of the inventive thin film magnetic head according to a fifth embodiment.
Figure 15:
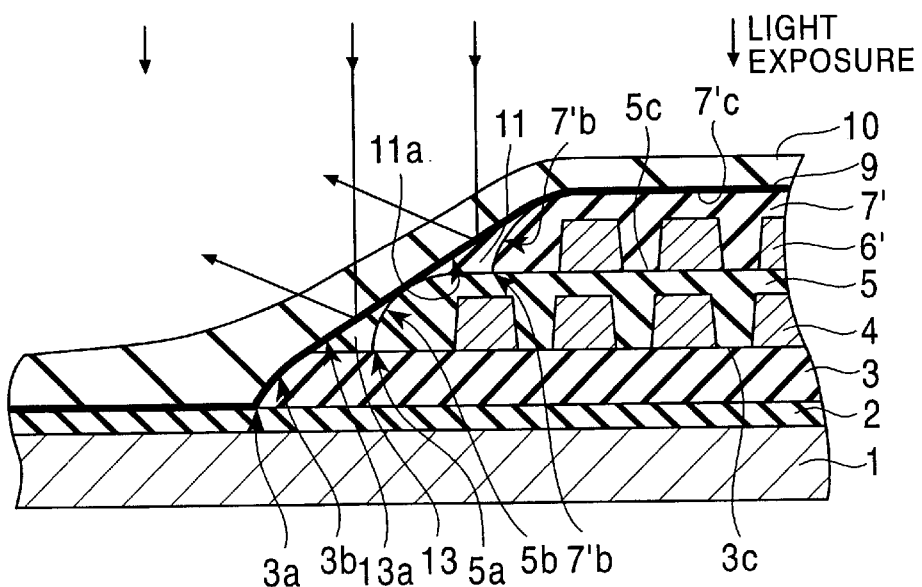
FIG. 15 is a cross sectional view of a substantial part of a step involved in producing the above thin film magnetic head.
Figure 16A:
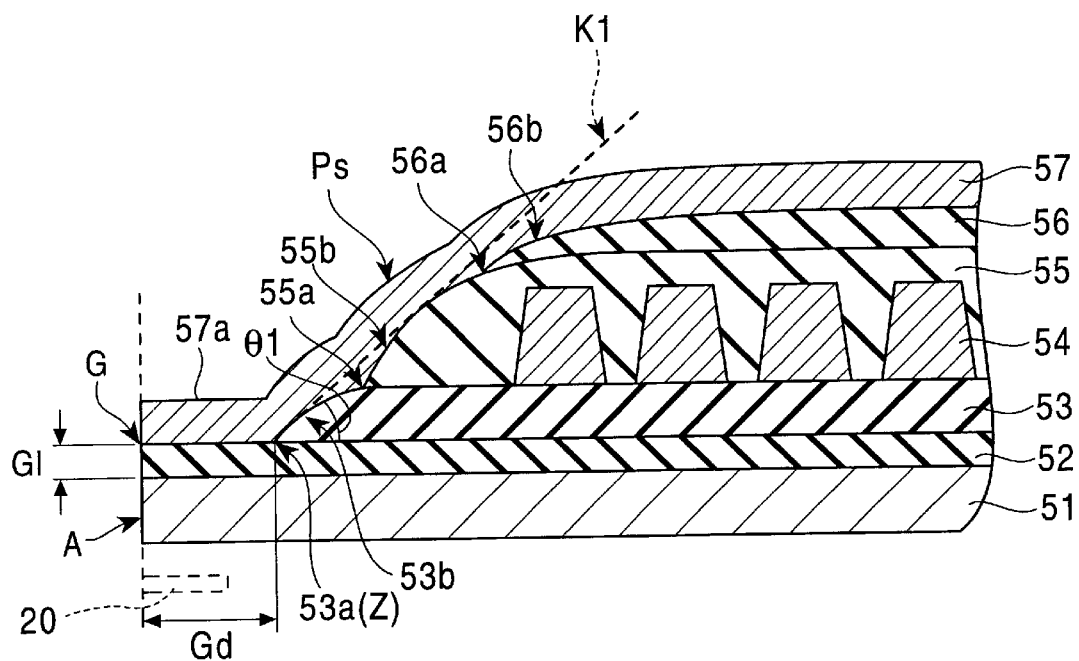
FIGS. 16A and 16B are illustrations of a conventional thin film magnetic head.
Figure 16B:
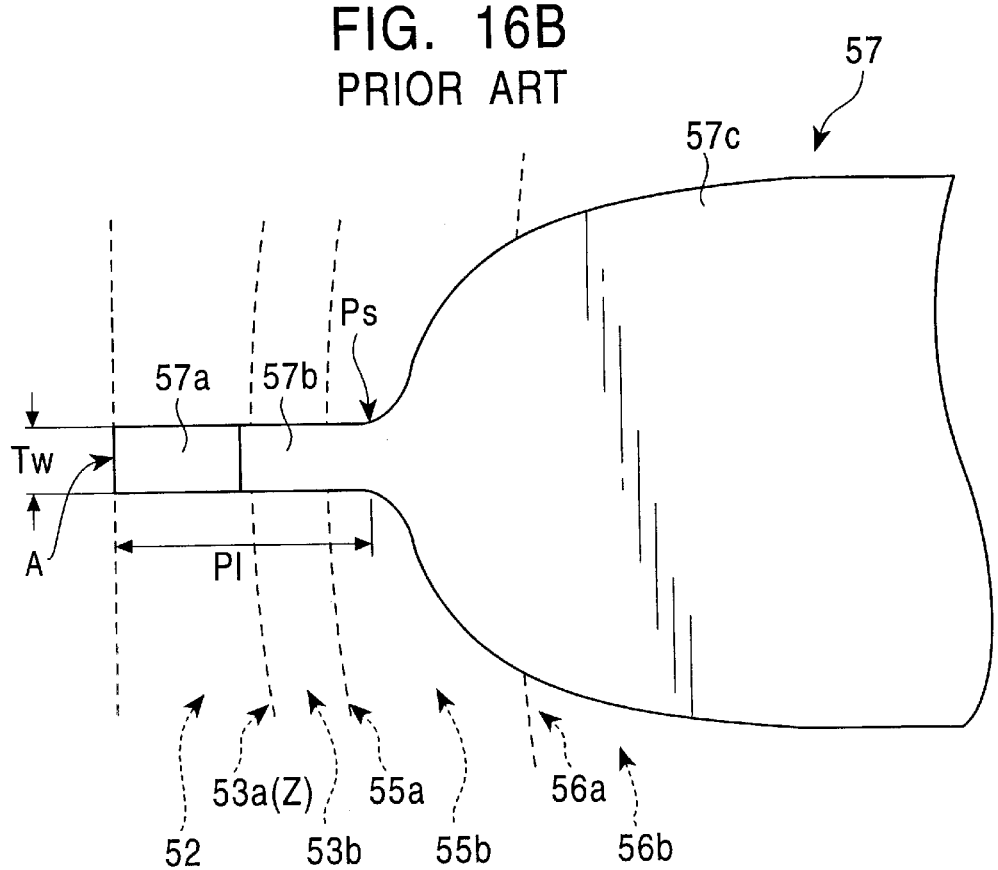
Figure 17A:
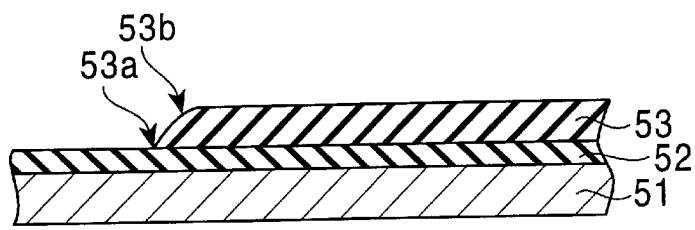
FIGS. 17A, 17B, 17C, 17D and 17E are cross sectional views illustrating the steps involved in producing the above conventional thin film magnetic head.
Figure 17B:
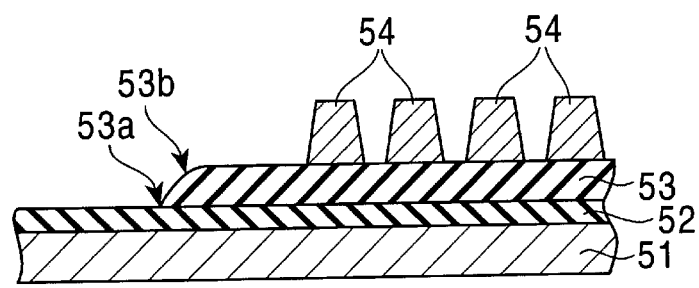
Figure 17C:
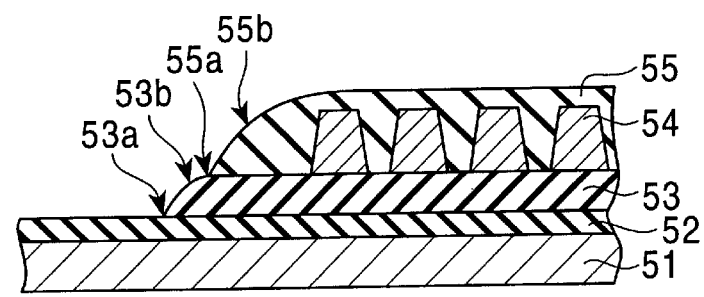
Figure 17D:
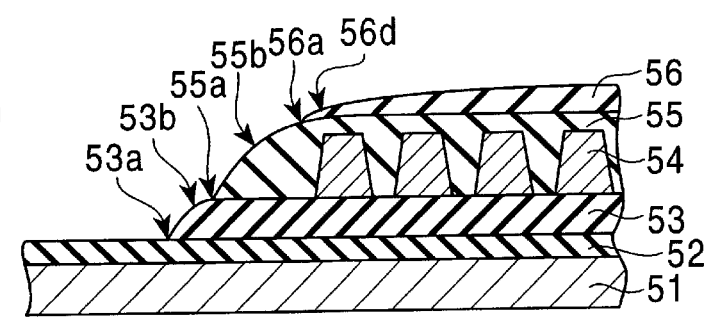
Figure 17E:
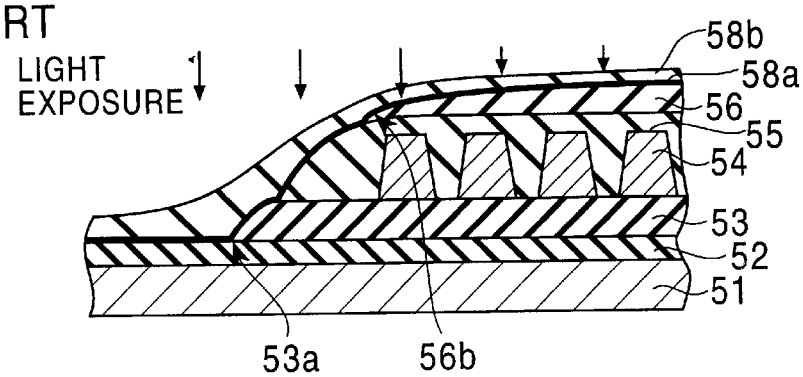
Figure 18A:
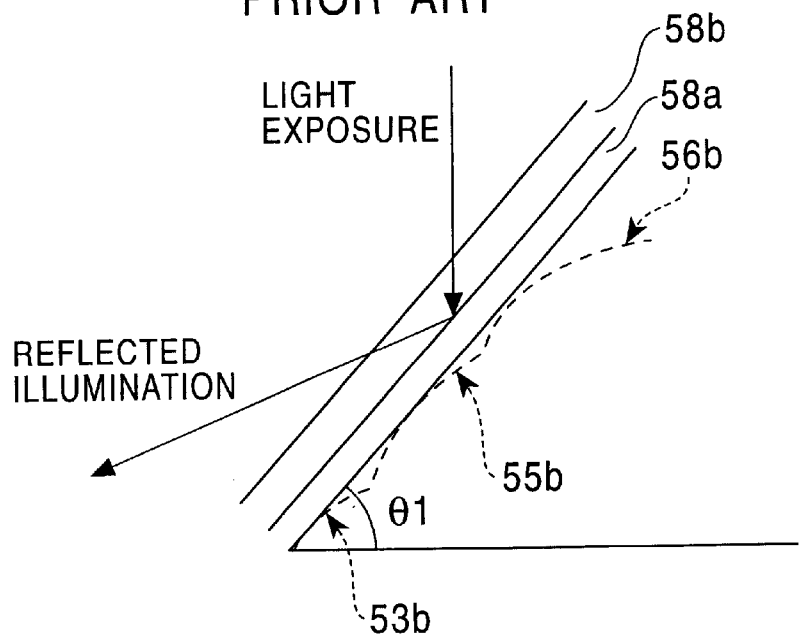
FIGS. 18A and 18B are illustrations of the production process shown in FIGS. 17A–17E.
Figure 18B:
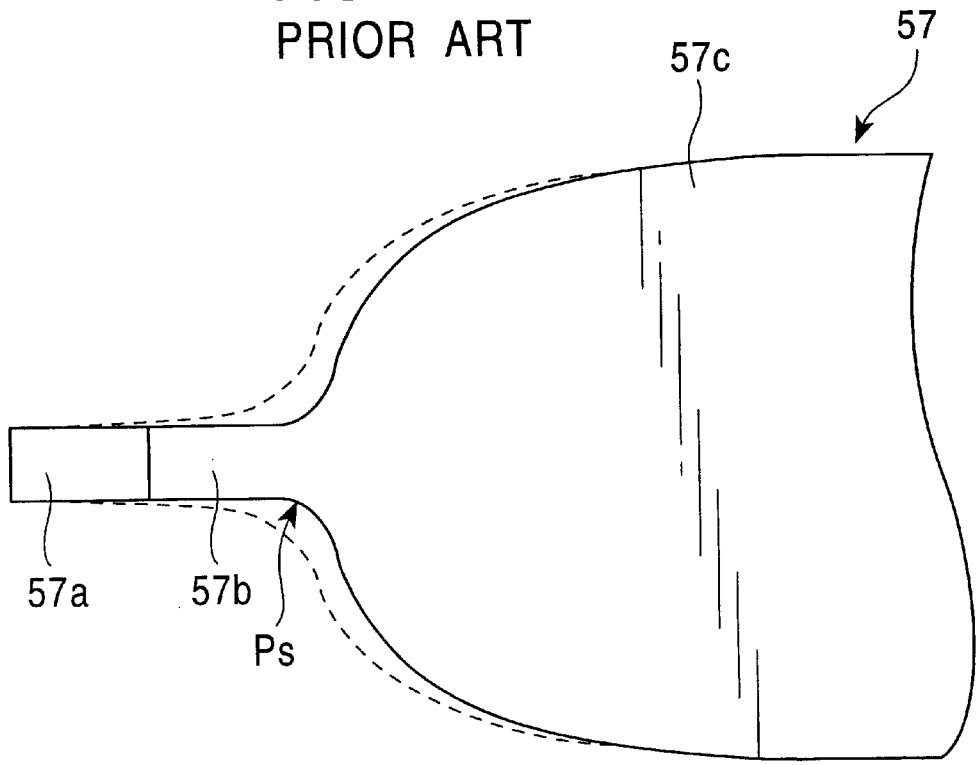
Figure 19A:
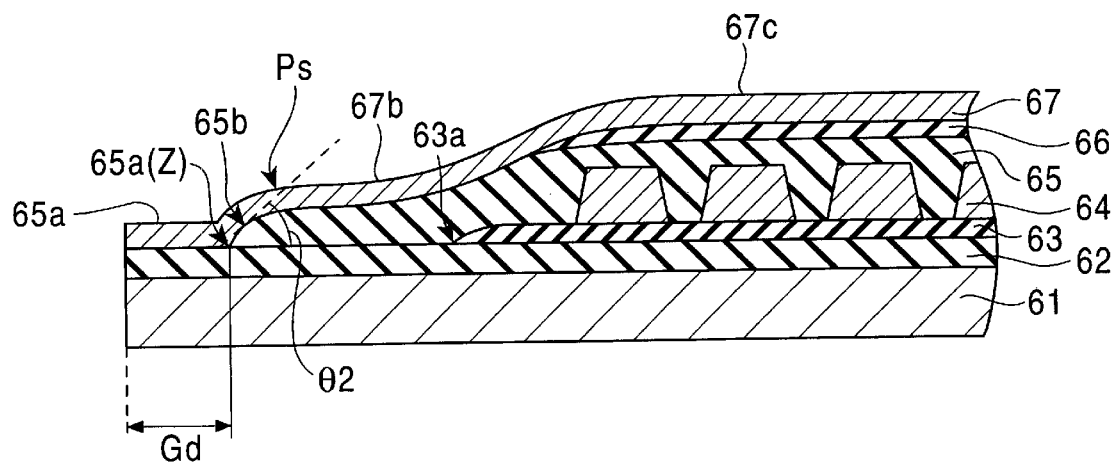
FIGS. 19A and 19B are cross sectional views illustrating a substantial part of the thin film magnetic head disclosed in U.S. Pat. No. 5,621,596.
Figure 19B:
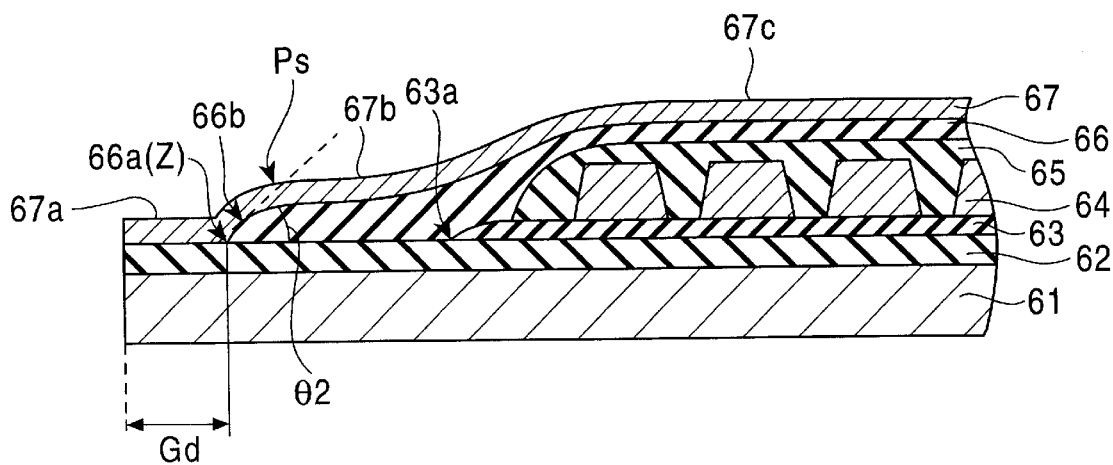
Figure 20A:
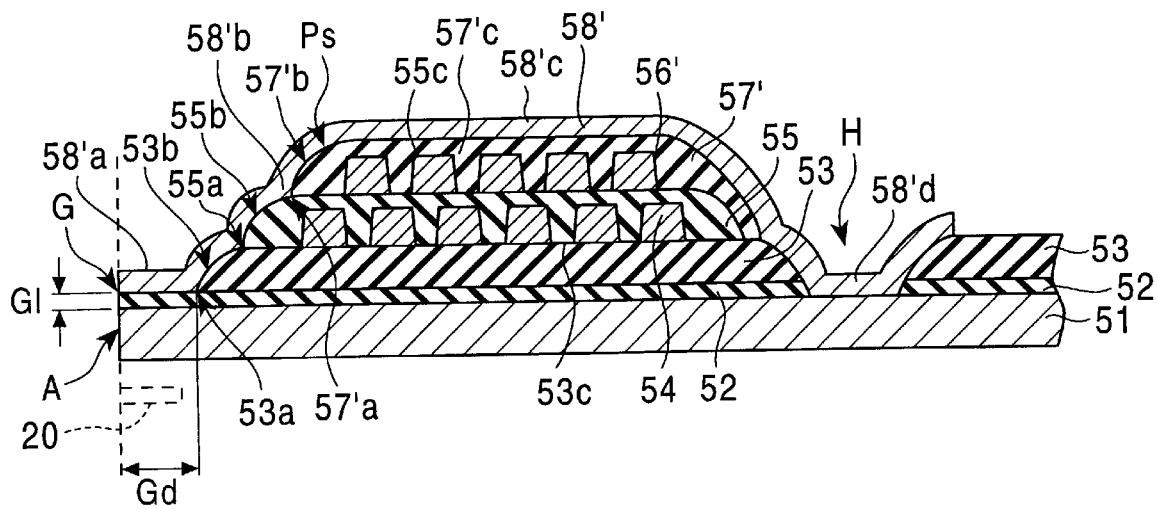
FIGS. 20A and 20B are illustrations of another conventional thin film magnetic head.
Figure 20B:
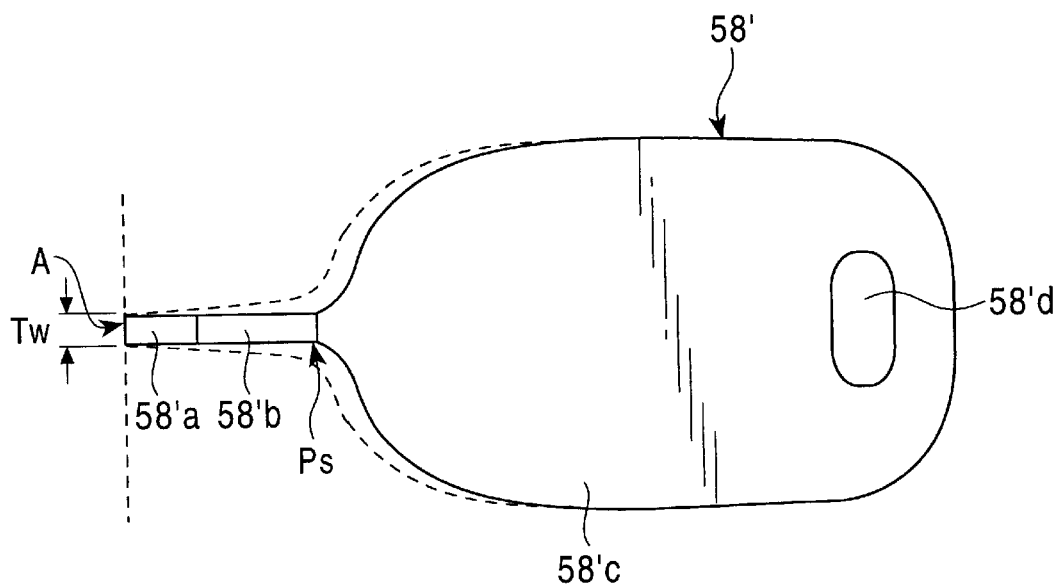
Figure 21A:
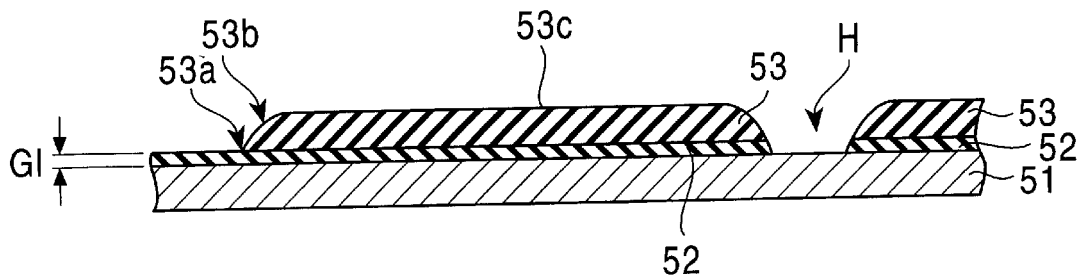
FIGS. 21A, 21B, 21C and 21D are cross sectional views illustrating the steps involved in producing the above conventional thin film magnetic head.
Figure 21B:
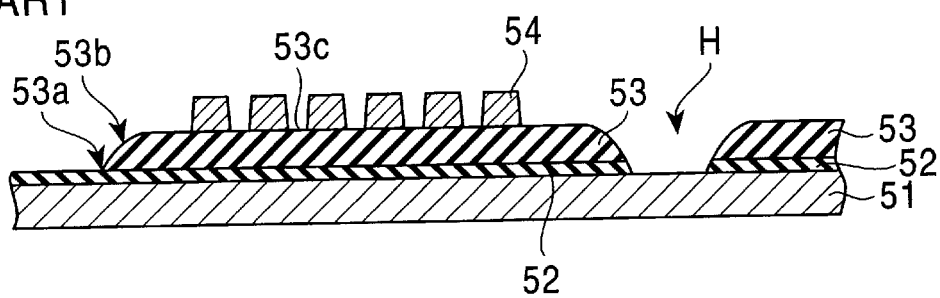
Figure 21C:
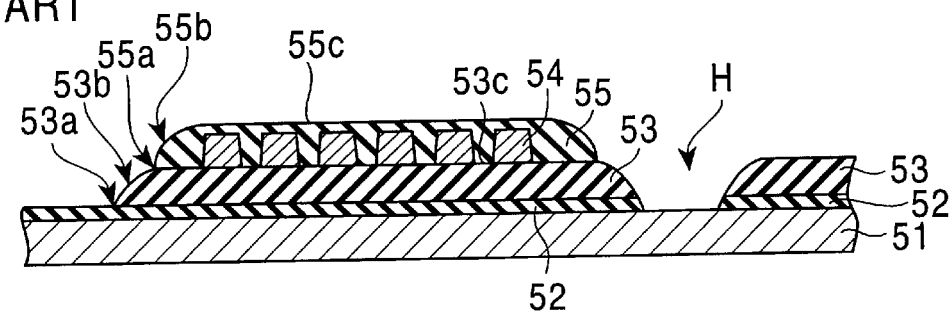
Figure 21D:
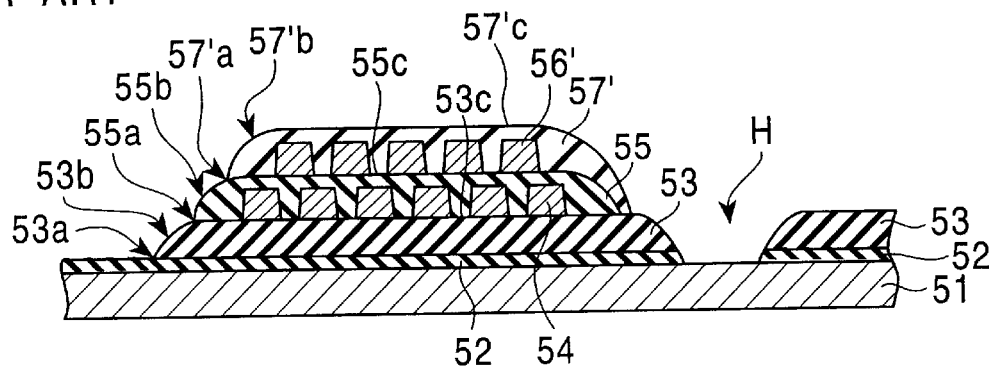
Figure 22A:
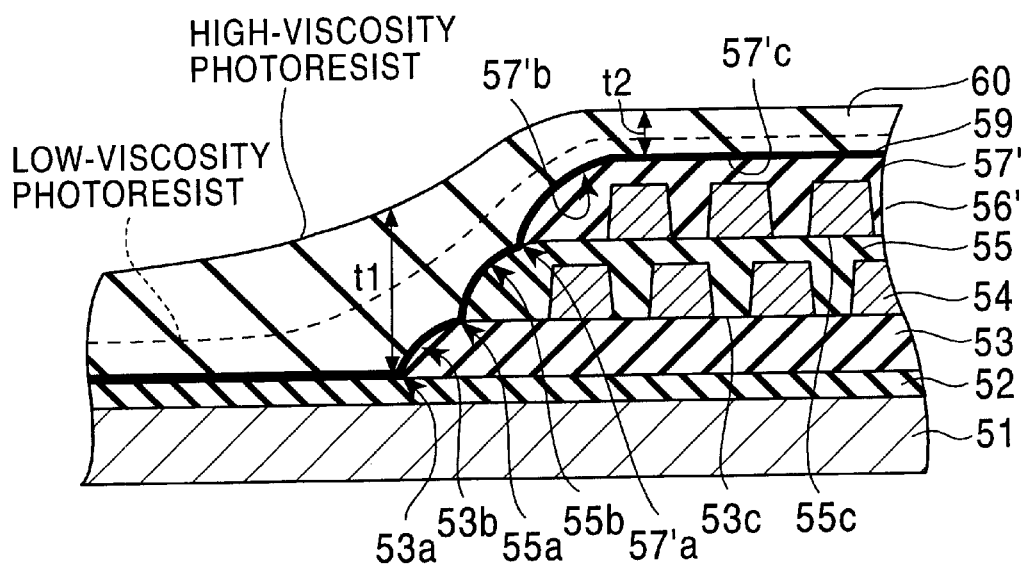
FIGS. 22A and 22B are cross sectional views of a substantial part of a step of the process for the production of the above conventional thin film magnetic head.
Figure 22B:
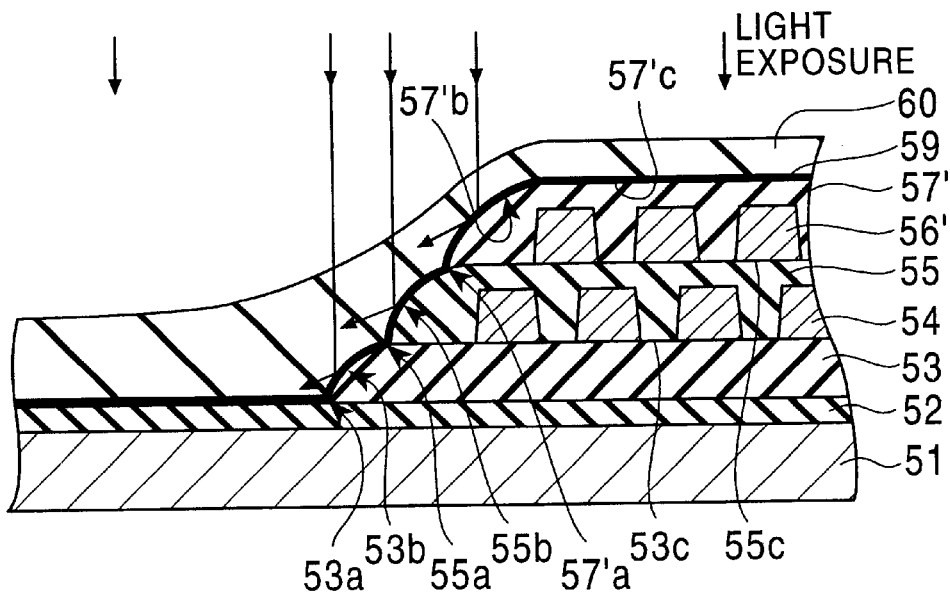

FIGS. 6A and 6B are illustrations of the inventive thin film magnetic head according to the second embodiment, in which FIG. 6A is a cross sectional view of its substantial part, and FIG. 6B is a top view of its upper core layer. FIGS. 7A through 7D and FIGS. 8A through 8C are cross sectional views showing the steps of the process for the production of the above thin film magnetic head. FIG. 9 is a cross sectional view of a substantial part of the inventive thin film magnetic head according to the third embodiment, and FIGS. 10A through 10D are cross sectional views showing the steps of the production process of the aforementioned thin film magnetic head. FIG. 11 is a cross sectional view of a substantial part of the inventive thin film magnetic head according to the fourth embodiment, and FIGS. 12A through 12D are cross sectional views showing the steps of the production process of the above thin film magnetic head. FIG. 13A and 13B are cross sectional views of a substantial part of a step of the production process of the above thin film magnetic head, in which FIG. 13A is a cross sectional view of the state where a photoresist layer used for frame plating is formed, and FIG. 13B is a cross sectional view illustrating the reflection of light exposure for exposing the photoresist layer. FIG. 14 is a cross sectional view of a substantial part of the inventive thin film magnetic head according to the fifth embodiment, and FIG. 15 is a cross sectional view of a substantial part illustrating a step of the production process of the thin film magnetic head just mentioned above.

Second Embodiment

The second embodiment of the inventive thin film magnetic head will now be described below. In the present thin film magnetic head shown in FIG. 6A, a lower core layer 1 of an inductive write head also serves as an upper shield layer of an magnetoresistive head (MR head) 20, and is composed of an Fe—Ni alloy (e.g., permalloy) or another highly permeable material. A gap layer 2 of $Al_2O_3$ or another nonmagnetic material is formed to a thickness of Gl on the lower core layer 1.

A first insulation layer 3 is formed from a resist material or another organic resinous material on the gap layer 2. The first insulation layer 3 has a first apex 3a, a first sloping region 3b and a first plane region 3c, in which the first apex 3a establishes a zero throat height Z which, in turn, defines a gap depth Gd; the first sloping region 3b extends from the first apex 3a and slopes upward with respect to the top of the gap layer 2; and the first plane region is connected to the first sloping region 3b and has a top nearly parallel to the top of the gap layer 2. A first coil layer 4 helical in plane is formed from Cu or another low-resistance conductive material on the first plane region 3c at a distance of 5 μm or more from the first apex 3a. A second insulation layer 5 is formed from a resist material or another organic resinous material on the first insulation layer 3 so as to cover the first coil layer 4. The second insulation layer 5 has a second apex 5a, a second sloping region 5b and a second plane region 5c, in which the second sloping region 5b extends upward from the first apex 5a, and the second plane region 5c extends from the second sloping region 5b and has a top nearly parallel to the top of the gap layer 2. The second apex 5a is located on the first sloping region 3b, and the second sloping region 5b is arranged nearly flush with the first sloping region 3b.

A second coil layer 6' of, for example, Cu is formed helical in plane on the second plane region 5c at a distance of 10 μm or more from the second apex 5a. A third insulation layer 7' is formed from a resist material or another organic resinous material on the second insulation layer 5 so as to cover the second coil layer 6', and has a third apex 7'a, a third sloping region 7'b extending upward from the third apex 7'a, and a third plane region 7'c commencing from the third sloping region 7'b and having a top nearly parallel to the top of the gap layer 2. The third apex 7'a is located on the second plane region 5c at a distance of about 6 μm or more from the second apex 5a, and the thus bared second plane region 5c and the third sloping region 7'b constitute a first pocket region P1. The distance between the second apex 5a and the third apex 7'a, between which the first pocket region P1 is located, is preferably 10 μm or less. If it exceeds 10 μm, the magnetic path of the magnetic circuit to be established is elongated, resulting in an increased inductance and deteriorated high frequency property.

An upper core layer 8' is formed from an Fe—Ni alloy (e.g., permalloy) or another magnetic material to a nearly uniform thickness of about 2 μm on the first, second and third insulation layers 3, 5, and 7' and the gap layer 2. The upper core layer 8' has a tip region 8'*a*, a connecting portion 8'*b*, a body portion 8'*c* and a back end region 8'*d*. The tip region 8'*a* is located on a surface facing a magnetic recording medium and is connected via the gap layer 2 to the lower core layer 1, and has a narrow width Tw; the connecting portion 8'*b* is connected to the tip region 8'*a* in a nearly identical width, and is formed on the first, second and third sloping regions 3*b*, 5*b* and 7'*b*; the body portion 8'*c* extends wider from the connecting portion 8'*b* and covers part of the first and second coil layers 4 and 6'; and the back end region 8'*d* is magnetically connected via a hole H to the lower core layer 1, and is wrapped with the first and second coil layers 4 and 6' therearound, and the hole H is formed in the gap layer 2 and the first insulation layer 3 at a position nearly the center of the first and second coil layers 4 and 6'. A connecting region (base region) between the connecting portion 8'*b* and the body portion 8'*c* is called "pole straight, Ps". In this connection, the first and second coil layers 4 and 6' are formed rounding the back end region 8'*d*, and only part of these layers are illustrated in FIG. 1A.

A magnetic gap G has a gap length Gl and a gap depth Gd. The gap length Gl is determined by a distance between the lower core layer 1 and the tip region 8'*a* (i.e., the thickness of the gap layer 2), and the gap depth Gd is determined by a depth of the tip region 8'*a*, that is, a distance between the air bearing surface (ABS) A which is for facing the magnetic recording medium and the first apex 3*a*. The track width Tw is determined by the width of the tip region 8'*a*. The inductive head having a dual structure coil layer composed of the first and second coil layers 4 and 6' of the inventive thin film magnetic head is thus configured.

Figure 7A:
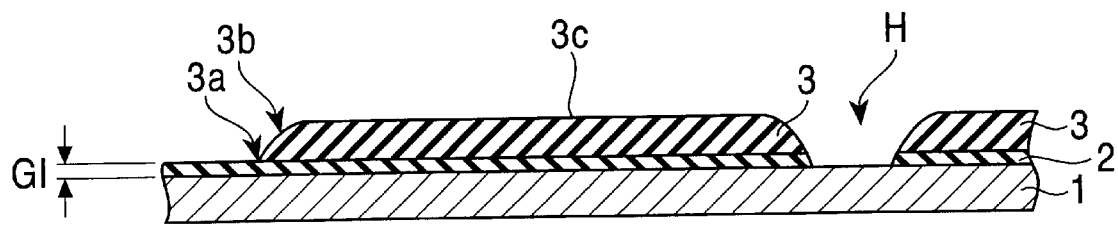
FIGS. 7A, 7B, 7C and 7D and FIGS. 8A, 8B and 8C are cross sectional views showing the steps involved in producing the above thin film magnetic head.

The production process for the present thin film magnetic head will be described below. Initially, the gap layer 2 is formed from Al$_2$O$_3$ or another nonmagnetic material to a thickness (gap length) of Gl on the lower core layer 1, and the lower core layer 1 is composed of an Fe—Ni alloy or another magnetic material. The first insulation layer 3 is then formed by, for example, lithography using a resist material or another organic resinous material. The coated resist material slopes, due to its comparatively high viscosity, through heat applied in a heating step for curing the resist material, and thus the first sloping region 3*b* extending from the first apex 3*a* is formed and an upper area of the first sloping region 3*b* establishes the first plane region 3*c* having a top nearly parallel to the top of the gap layer 2 (FIG. 7A). Separately, the hole H for connecting the upper core layer 8' to the lower core layer 1 is formed by etching or another technique, which core layer 8' will be formed in later steps.

Figure 7B:
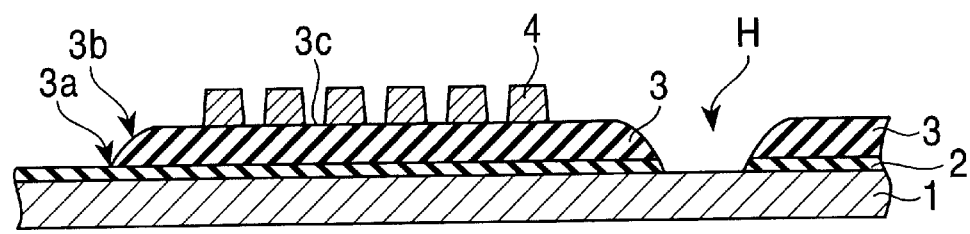

Next, the first coil layer 4 is formed helical in plane on the first plane region 3*c* at a distance of about 5 to 8 μm from the first apex 3*a*, by plating with, for example, Cu (FIG. 7B).

Figure 7C:
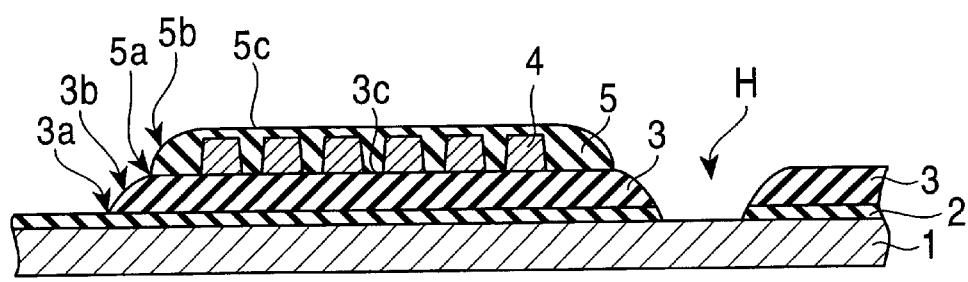

The second insulation layer 5 is then laminated on the first insulation layer 3 so as to cover the first coil layer 4, by photolithography using a resist material or another organic resinous material (FIG. 7C). In this step, the second sloping region 5*b* is provided extending from the second apex 5*a*, and an upper area of the second insulation layer 5 establishes the second plane region 5*c* nearly parallel to the top of the gap layer 2, as in the first insulation layer 3. The second apex 5*a* is located on the first sloping region 3*b*, and the second sloping region 5*b* is arranged nearly flush with the first sloping region 3*b*.

Figure 7D:
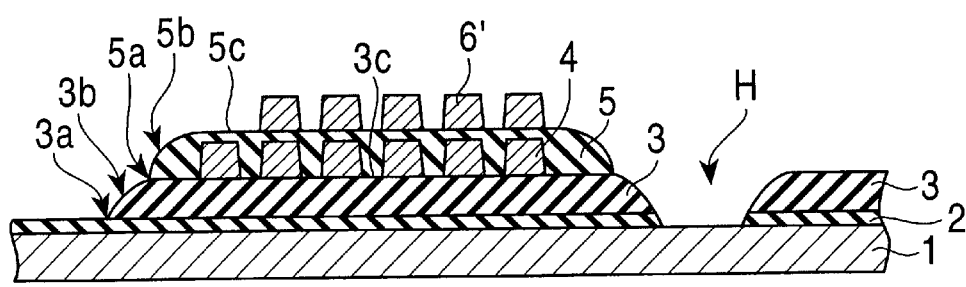

On the second plane region 5*c*, the second coil layer 6' helical in plane is formed at a distance of 10 μm or more from the second apex 5*a*, by plating with, for example, Cu (FIG. 7D).

Figure 8A:
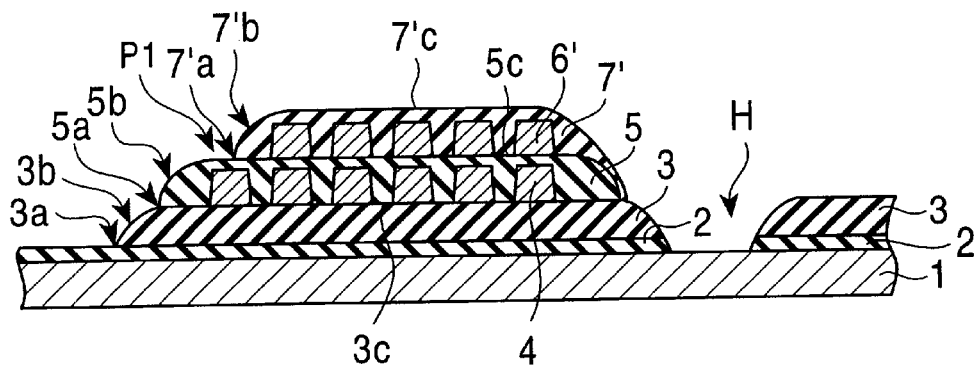
Figure 8B:
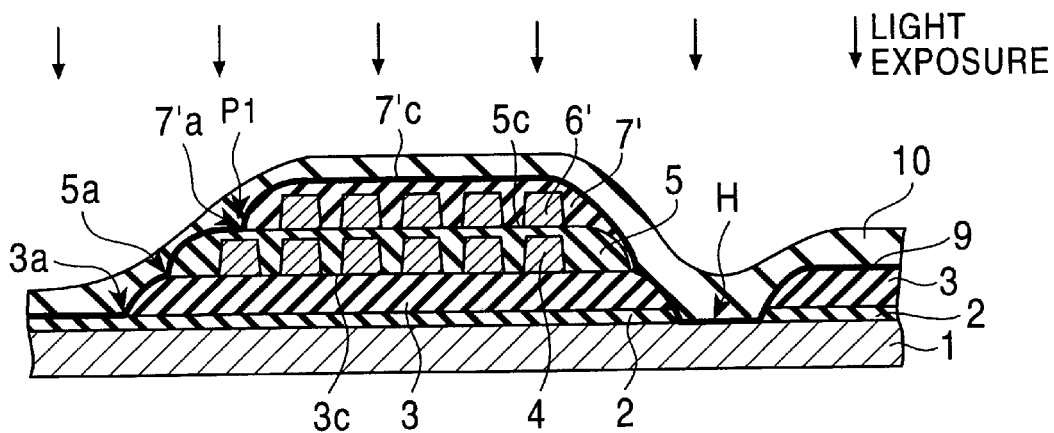

The third insulation layer 7' is formed on the second insulation layer 5 so as to cover the second coil layer 6', by photolithography using a resist material or another organic resinous material (FIG. 8A). In this step, the third sloping region 7'*b* is formed extending upward from the third apex 7'*a*, and its top constitutes the third plane region 7'*c* nearly parallel to the top of the gap layer 2, as in the second insulation layer 5. The third apex 7'*a* is located on the second plane region 5*c*, and the third sloping region 7'*b* is located rewardly with respect to the second sloping region 5*b*, and part of the second plane region 5*c* is thus bared. The bared second plane region 5*c* and the third sloping region 7'*b* constitute the first pocket region The upper core layer 8' is then formed by frame plating. Initially, a thin film of a primary coat 9 of the same material with the upper core layer 8', i.e., an Fe—Ni alloy or another magnetic material (conductive material), is formed at least over the first, second and third insulation layers 3, 5 and 7' and on the gap layer 2, by sputtering or another vacuum film formation technique. A resist material is then spin coated onto the primary layer 9 to form a photoresist layer 10 (FIG. 8B). The resist material used herein has a comparatively low viscosity, about 270 cp. The thus obtained photoresist layer 10 has a thickness of 7 μm or less on the gap layer 2 in the vicinity of the first apex 3*a*, due to its comparatively low viscosity. In the vicinity of the top of the third insulation layer 7', the resist material flows into the first pocket region P1 to form an accumulation of the resist, and thereby to prevent the resist material from flowing downward. The photoresist layer 10 can therefore have a comparatively large thickness, i.e., 2 μm or more, on top of the third insulation layer 7', in spite of using resist material having a comparatively low viscosity. By providing the pocket region P1, a resist material having a comparatively low viscosity can be used for the formation of the photoresist layer 10, and the thickness of the photoresist layer 10 in the vicinity of the tip region 8'*a* of the upper core layer 8', and in the vicinity of the first apex 3*a*, which is in the vicinity of the pole straight Ps of the connecting portion 8'*b*, can be reduced, and the that on top of the third insulation layer 7' can be increased.

Figure 8C:
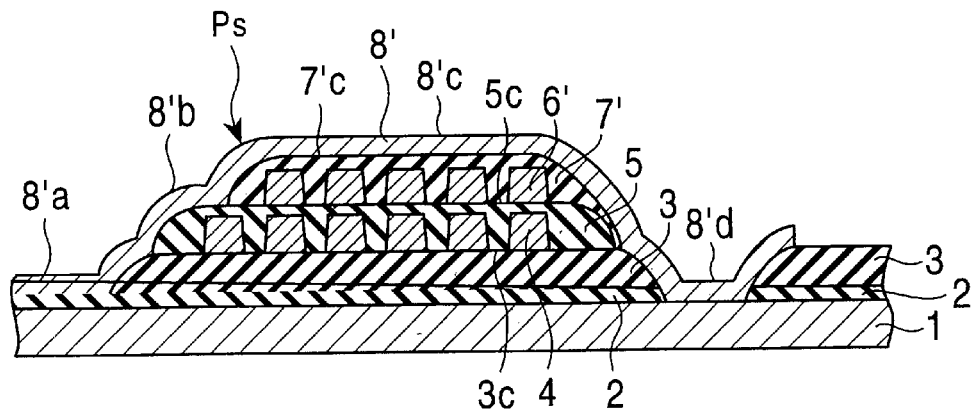

The upper core layer 8' is then patterned by exposing the photoresist layer 10 with light from above in the direction indicated by arrows in FIG. 8B, and by subsequent development, exposed areas of the photoresist layer 10 are removed. A film of an Fe—Ni alloy or another magnetic material is then plated to a thickness of about 4 μm on areas where the primary coat 9 is bared. The residual photoresist layer 10 and unnecessary portions of the primary coat 9 are removed to give the upper core layer 8' (FIG. 8C). The top of the upper core layer 8' is covered by a protective film (not shown) of, for example, Al$_2$O$_3$.

The upper core layer 8' has the narrow tip region 8'*a*, and the connecting portion 8'*b*; in which the tip region 8'*a* is formed on the gap layer 2 and is located on a surface facing the magnetic recording medium; the connecting portion 8'*b* extends from the tip region 8'*a* and is formed on the first sloping region 3*b* and the second sloping region 5*b*. The pole straight Ps is formed on the third sloping region 7'*b*, and the body portion 8'c connected to the connecting portion 8'b is formed so as to cover areas on the third plane region 7'c over the first and second coil layers 4 and 6'.

Finally, unnecessary portion of the thin film laminate is removed, and the air bearing surface (ABS) A is formed by lapping, and the gap depth Gd is determined by a distance from the ABS A to the first apex 3a to give a thin film magnetic head having the inductive head shown in FIGS. 6A and 6B. In this connection, the primary coat 9 is integrated with the upper core layer 8', and is therefore not shown in these figures.

The overall thickness of the first, second and third insulation layers 3, 5 and 7' is large because of the dual coil layer structure composed of the first and second coil layers 4 and 6'. However, the first pocket region P1 formed by moving the third apex 7'a rewardly allows the spin-coated resist material in the formation of the photoresist layer 10 to accumulate in the first pocket region P1, which prevents the resist material from flowing downward even if it has a low viscosity. The photoresist layer 10 on top of the third insulation layer 7' can therefore have a sufficient thickness to form the upper core layer 8'. The use of such a resist material having a low viscosity permits the photoresist layer 10 to have a smaller thickness in the vicinity of the first apex 3a on the gap layer 2 than that of the layer using a high-viscosity resist material of about 800 cp (FIG. 8B). Accordingly, in the formation of the photoresist layer 10, there is no need of reducing the wavelength of an exposure light source and increasing the focal depth, and the definition (resolution) is not deteriorated, and the tip region 8'a can be patterned with a satisfactory precision to form the tip region 8'a with a narrow track width Tw having predetermined dimensions.

Third Embodiment

The inventive thin film magnetic head according to the third embodiment will now be described in detail. The present thin film magnetic head has nearly the same configuration with that of the second embodiment mentioned above, and is featured by a forth insulation layer 11 formed in the first pocket region P1 and having a fourth sloping region 11a connecting between the second sloping region 5b and the third plane region 7'c (FIG.

The fourth insulation layer 11 can be produced in the following manner: Initially, the first, second and third insulation layers 3, 5 and 7', and the first and second coil layers 4 and 6' are formed in turn on the gap layer 2 to form the pocket region P1 constituted by the bared second plane region 5c and the third sloping region 7'b, as illustrated in FIG. 8A regarding the second embodiment. Next, a photoresist layer 12 is formed by spin coating a thermosetting resist material onto the gap layer 2, the first, second and third layers 3, 5, and 7' (FIG. 10A). The photoresist layer 12 is then exposed with light and then developed by photolithography for patterning, and exposed areas of the photoresist layer 12 surrounded by the lines T on the second sloping region 5b and the third insulation layer are removed (FIG. 10B). The residual photoresist layer 12 is then gradually heated and is cured by evaporating a solvent in the resist material and reducing its volume (FIG. 10C). Thus, the fourth insulation layer 11 is formed in the pocket region P1 so as to connect between the second apex 5a and the third plane region 7'c. By this configuration, the fourth sloping region 11a has a lower angle than those of the first and second sloping regions 3b and 5b.

Then, the upper core layer 8' is formed on the first, second, third and fourth insulation layers 3, 5, 7' and 11 by frame plating in the same manner as in the second embodiment. In this procedure, the photoresist layer 10 is formed on the primary coat 9 by spin coating of a resist material having a viscosity of about 270 cp. In this step, the resist material does not accumulate in the first pocket region P1, as distinct from the second embodiment, because the first pocket region P1 is filled with the fourth insulation layer 11. However, the fourth sloping region 11a of the fourth insulation layer 11 connects gently between the second sloping region 5b and the third plane region 7'c, and the resist material therefore resists flowing downward on top between the third insulation layer 71 and the forth sloping region 11a, and the photoresist layer 10 on top of the third insulation layer 7' can have a sufficient thickness to form the upper core layer 8'. The exposure light reflected on the primary coat 9 on the forth sloping region 11a hardly comes into the other areas than those for patterning the upper core layer 8', because of its gentle slope and low inclination angle, resulting in patterning of the upper core layer 8' on the photoresist layer 10 with a high precision.

Fourth embodiment

The inventive thin film magnetic head according to the fourth embodiment will now be described. The present thin film magnetic head has nearly the same configuration with that of the second embodiment, and is featured by the following configuration: The first coil layer 4 of Cu or another low-resistance conductive material helical in plane is located at a distance of 10 $\mu$m or more from the first apex 3a, and corresponding to this arrangement, the second insulation layer 5 covering the first coil layer 4 has the second apex 5a located on the first plane region 3c at a distance of about 6 $\mu$m or more from the first apex 3a. Thus, the bared first plane region 3c and the second sloping region 5b constitute a second pocket region P2 (FIG. 11). The distance between the first apex 3a and the second apex 5a, between which the second pocket region P2 is located, is preferably 10 $\mu$m or less. If it exceeds 10 $\mu$m, the magnetic path of the magnetic circuit to be established is elongated, resulting in an increased inductance and deteriorated high frequency property.

The present thin film magnetic head can be produced in the following manner: Initially, the gap layer 2 is formed from $Al_2O_3$ or another nonmagnetic material to a thickness (gap length) Gl on the lower core layer 1 which is composed of an Fe—Ni alloy or another magnetic material. The first insulation layer 3 is then formed thereonto by, for example, lithography using a resist material or another organic resinous material. The applied resist material slopes, due to its viscosity, through heat applied in a heating step for curing the resist material, and thus the first sloping region 3b commencing from the first apex 3a is formed and an upper area of the first sloping region 3b establishes the first plane region 3c having a top nearly parallel to the top of the gap layer 2 (FIG. 12A).

Figure 12B:
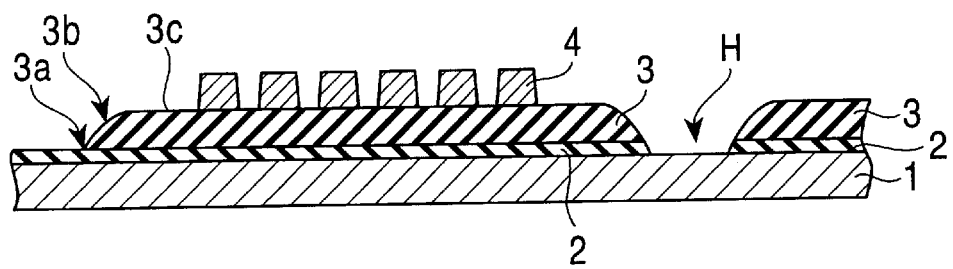

Next, the first coil layer 4 is formed helical in plane on the first insulation layer 3 at a distance 10 $\mu$m or more from the first apex 3a, by plating with, for example, Cu (FIG. 12B).

Figure 12C:
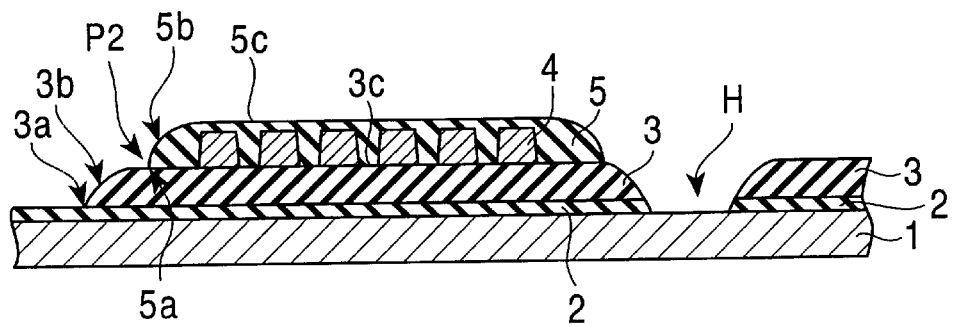

The second insulation layer 5 is then formed on the first insulation layer 3 so as to cover the first coil layer 4, by coating a resist material or another organic resinous material and then subjecting the coated layer to lithography (FIG. 12C). In this step, the second sloping region 5b extending from the second apex 5a is formed, and an upper area of the second insulation layer 5 establishes the second plane region 5c which is nearly parallel to the top of the gap layer 2, as in the first insulation layer 3. The second apex 5a is located on the first plane region 3c, and the second sloping region 5b is arranged rewardly with respect to the first sloping region 3b, and part of the first plane region 3c is thus bared. The bared portion of the first plane region 3c and the second sloping region 5b constitute the second pocket region P2.

Figure 12D:
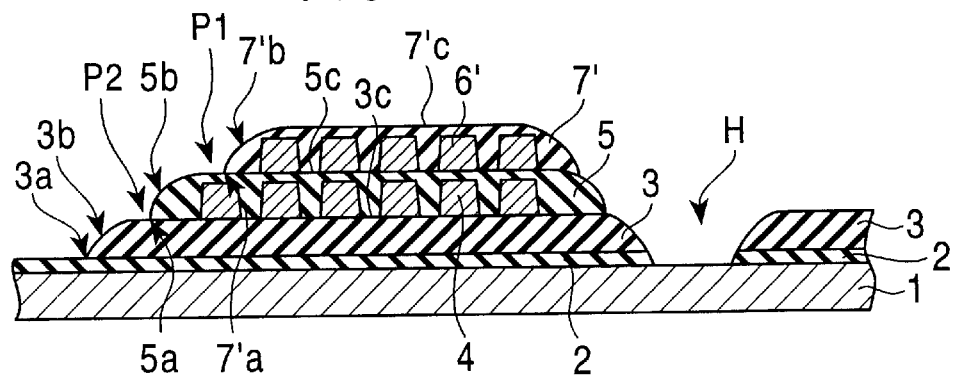

The second coil layer 6' and the third insulation layer 7' are then formed in the same manner as in the second embodiment, and the first pocket region P1 is constituted by the third sloping region 7'b and the top of the second insulation layer 5 (FIG. 12D).

The upper core layer 8' is formed on the first, second, and third insulation layers 3, 5 and 71, and the gap layer 2 by frame plating. For this purpose, the primary coat 9 and photoresist layer 10 are formed (FIG. 13A). In this procedure, as in the second embodiment, the resist material spin coated for the formation of the photoresist layer 10 accumulates in the first pocket region P1 and resists flowing down toward the gap layer 2, and the photoresist layer 10 can have a sufficient thickness on top of the third insulation layer 7' even using a low-viscosity resist material. Furthermore, by providing the second pocket region P2, the resist material also accumulates in the second pocket region P2, resulting in further uniformed thickness of the photoresist layer 10. The second pocket region P2 inhibits from reflected illumination of the exposure light reflected on the primary coat 9 on the second and third sloping regions 5b and 7'b from coming into the gap layer 2 where the tip region 8'a is to be formed, when the upper core layer 8' is patterned by exposing the photoresist layer 10 with light (FIG. 13B). Thus, the tip region 8'a with a narrow track width Tw can be formed with high precision.

Fifth embodiment

The inventive thin film magnetic head according to the fifth embodiment will now be described. The present thin film magnetic head has nearly the same configuration as in the fourth embodiment just mentioned above, and is featured by a fifth insulation layer 13 formed in the second pocket region P2. The fifth insulation layer 13 has a fifth sloping region 13a connecting between the first sloping region 3b and the second plane region 5c (FIG. 14). The forth insulation layer 11 is formed in the first pocket region P1.

The fifth insulation layer 13 is produced by coating a resist material, exposing and developing the coated layer to remove unnecessary areas and heating and curing the residual areas, in a similar manner to that of the fourth insulation layer 11 in the third embodiment. The detail of this production process is omitted herein.

After forming the fifth insulation layer 13, a thin film of the primary coat 9 is formed from the same material, an Fe—Ni alloy or another magnetic material, with that of the upper core layer 8' on the first, second, third, fourth and fifth insulation layers 3, 5, 7', 11 and 13, and a resist material is spin coated onto the primary coat 9 to form the photoresist layer 10 (FIG. 15). The fifth sloping region 13a together with the fourth sloping region 11a slopes gently, and the resist material resists flowing downward, which permits the photoresist layer 10 on top of the third insulation layer 7' to have a sufficient thickness to form the upper core layer 8'. When the upper core layer 81 is patterned by exposing the photoresist layer 10 with light from above, part of the exposure light, if any, which penetrates through the photoresist layer 10 and is reflected on the primary coat 9 is directed to upward without coming into the gap layer 2 where the tip region 8'a is to be formed, and the tip region 8'a with a narrow track width Tw with high precision can be obtained.

According to the inventive thin film magnetic head, in an aspect, a thin film magnetic head comprising an upper core layer having a tip region and connecting portion with a fine track width formed with high precision on the third sloping region of the third insulation layer which defines the controlled apex angle can be obtained with satisfactory overwrite property, resulting in a higher recording density of a magnetic recording medium. This is because the present thin film magnetic head includes: a lower core layer of a magnetic material; a gap layer of a nonmagnetic material formed on top of the lower core layer; a first insulation layer formed on top of the gap layer and having a first apex, the first apex being located on a surface facing a magnetic recording medium and defining a gap depth; a coil layer formed on the first insulation layer and being located at a first predetermined distance from the first apex; a second insulation layer laminated on the first insulation layer so as to cover the coil layer, the second insulation layer having a second apex, the second apex being located on the surface facing the magnetic recording medium at a second predetermined distance from the first apex; a third insulation layer formed on the first insulation layer in a bared area between the first and second apexes, the third insulation layer having an inclined plane sloping at a predetermined angle with respect to the top of the gap layer; and an upper core layer of a magnetic material having a tip region, a connecting portion and a body portion, the tip region being located on a surface facing the magnetic recording medium and establishing a magnetic gap via the gap layer, the body portion being formed on top of the second and third insulation layers and having a back end region being in contact with the lower core layer, and the connecting portion connecting between the tip region and the body portion, and being formed on top of the first and third insulation layers.

When the predetermined angle of the sloping region in the above thin film magnetic head is set in the rage from 15° to 50°, a thin film magnetic head having an upper core layer with tip region and connecting portion whose dimensions are controlled with high precision, and having satisfactory overwrite property with less leakage magnetic field can be obtained, resulting in a higher recording density of a magnetic recording medium.

According to the process for the production of the above thin film magnetic head, the sloping region of the third insulation layer which defines a controlled apex angle can be formed with facility, and the tip region and connecting portion with a narrow track width of the upper core layer can formed with high precision, and therefore the recording density of magnetic recording media can be increased by the use of thus obtained thin film magnetic head having satisfactory overwrite property. This is because the process just mentioned above includes the steps of: forming a lower core layer from a magnetic material; forming a gap layer from a nonmagnetic material on top of the lower core layer; forming a first insulation layer on top of the gap layer, the first insulation layer having a first apex, the first apex being located on a surface facing a magnetic recording medium and defining a gap depth; forming a coil layer on top of the first insulation layer at a first predetermined distance from the first apex; forming a second insulation layer on top of the first insulation layer so as to cover the coil layer, the second insulation layer having a second apex, the second apex being located on a surface facing the magnetic recording medium at a second predetermined distance from the first apex; forming a third insulation layer on top of the first insulation layer in an area bared between the first and second apexes, the third insulation layer having an inclined plane sloping at a predetermined angle with respect to the top of the gap layer; and forming an upper core layer having a tip region, a connecting portion and a body portion from a magnetic material, the tip region being located on top of the gap layer on a surface facing the magnetic recording medium, the body portion being located on top of the second and third insulation layers with its back end region being in contact with the lower core layer, and the connecting portion connecting between the tip region and the body portion, and being located on the first and third insulation layers.

When the predetermined angle of the sloping region in the above production process is set to be in the range from 15° to 50°, a resist material for the formation of the upper core layer by frame plating can be coated in a uniform thickness, and a photoresist layer whose dimensions are controlled with high precision can be obtained in an exposure step for patterning.

When the above upper core layer in the above production process is formed by the steps of: forming a primary coat from a magnetic material on top of the gap layer and the first, second and third insulation layers; forming a photoresist layer on top of the primary coat; patterning the upper core layer by exposing the photoresist layer with light from above; removing exposed patterned areas of the photoresist layer; and forming the upper core layer from the magnetic material by frame plating using the photoresist layer, an upper core layer with controlled dimensions can be formed.

According to the inventive thin film magnetic head, in another aspect, the first pocket region provides a photoresist layer having a sufficient thickness to form the upper core layer by frame plating on the insulation layer, in particular over a dual coil layer structure, without flowing downward even when a low-viscosity resist material is used. In addition, the use of a low-viscosity resist material can yield a comparatively thin photoresist layer in an area where the tip region is to be formed, and thus yield a thin film magnetic head with an upper core layer whose dimensions are controlled with high precision. This is because the thin film magnetic head just mentioned above includes: a lower core layer of a magnetic material; a gap layer of a nonmagnetic material formed on top of the lower core layer; a first insulation layer formed on top of the gap and having a first apex, a first sloping region and a first plane region, the first apex being located on a surface facing a magnetic recording medium and defining a gap depth, the first sloping region extending upward from the first apex, and the first plane region being connected to the first sloping region and being nearly parallel to the top of the gap layer; a first coil layer formed on top of the first plane region of the first insulation layer; a second insulation layer laminated on the first insulation layer so as to cover the first coil layer, the second insulation layer having a second apex, a second sloping region and a second plane region, the second apex being located on a surface facing the magnetic recording medium, the second sloping region extending upward from the second apex, and the second plane region being connected to the second sloping region and being nearly parallel to the gap layer; a second coil layer formed on top of the second plane region of the second insulation layer; a third insulation layer laminated on the second insulation layer so as to cover the second coil layer, the third insulation layer having a third apex and a third sloping region, the third apex being located on the second plane region on a surface facing the magnetic recording medium, and the third sloping region extending upward from the third apex; a first pocket region constituted by the second plane region and the third sloping region; and an upper core layer of a magnetic material formed on top of the gap layer and the first, second and third insulation layers, the upper core layer having a tip region and a back end region, the tip region being located on a surface facing to the magnetic recording medium, and establishing a magnetic gap via the gap layer, and the back end region being in contact with the lower core layer.

When the above thin film magnetic head further includes a fourth insulation layer having a fourth sloping region, which fourth insulation layer is formed by filling the first pocket region with an insulative material, the reflected illumination of the exposure light reflected on the primary coat on the fourth sloping region resists to come into the other areas than the areas for patterning the upper core layer, because of gentle slope of the fourth sloping region. As a result, a thin film magnetic head with an upper core layer which highly controlled pattern can be obtained.

In case that the second apex in the above thin film magnetic head is formed on top of the first plane region, and a second pocket region is established by the thus bared first plane region and the second sloping region, the formed photoresist layer can have a more uniform thickness, and the second pocket region together with the first pocket region prevents the reflected illumination on the primary coat on the second and third sloping regions from coming into the gap layer where the tip region is to be formed, resulting in a thin film magnetic head with an upper core layer having highly controlled dimensions.

By filling the second pocket region with an insulative material to form a fifth insulation layer having a fifth sloping region in the above thin film magnetic head, when the upper core layer is patterned by exposing the photoresist layer with light from above, part of the exposure light, if any, which penetrates through the photoresist layer and is reflected on the primary coat is directed to upward without coming into the gap layer where the tip region is to be formed, resulting in a thin film magnetic head with an upper core layer having highly controlled dimensions.

According to another process for the production for the production of the inventive thin film magnetic head, when the upper core layer is patterned by exposing the photoresist layer with light from above, part of the exposure light, if any, which penetrates through the photoresist layer and is reflected on the primary coat, is directed to upward without coming into the gap layer where the tip region is to be formed. By this configuration, an upper core layer whose dimensions are controlled with high precision can be obtained. This is because the aforementioned process includes the steps of: forming a lower core layer from a magnetic material; forming a gap layer from a nonmagnetic material on top of the lower core layer; forming a first insulation layer on top of the gap layer, the first insulation layer having a first apex, a first sloping region and a first plane region, the first apex being located on a surface facing a magnetic recording medium and defining a gap depth, the first sloping region extending upward from the first apex, and the first plane region being connected to the first sloping region and being nearly parallel to the top of the gap layer; forming a first coil layer on top of the first plane region of the first insulation layer; laminating a second insulation layer on top of the first insulation layer so as to cover the first coil layer, the second insulation layer having a second apex, a second sloping region and a second plane region, the second apex being located on a surface facing the magnetic recording medium, the second sloping region extending upward from the second apex, the second plane region being connected to the second sloping region and being nearly parallel to the top of the gap layer; forming a second coil layer on top of the second plane region of the second insulation layer; laminating a third insulation layer so as to cover the second coil layer, the third insulation layer having a third apex, a third sloping region and a third plane region, the third apex being located on the second plane region on a surface facing the magnetic recording medium, the third sloping region extending upward from the third apex, and the third plane region being connected to the third sloping region and being nearly parallel to the top of the gap layer; establishing a first pocket region by a bared area of the second plane region, and the third sloping region; forming a primary coat from a conductive material on top of the gap layer and the first, second and third insulation layers; forming a photoresist layer by coating a resist material onto the primary coat; patterning an upper core layer by photolithography of the photoresist layer; and forming a tip region and a body portion of the upper core layer from a magnetic material on top of the first, second and third insulation layer, the tip region being located on top of the gap layer, and the body portion being connected to the tip region and having a back end region being in contact with the lower core layer.

What is claimed is:

1. A thin film magnetic head comprising:

a lower core layer of a magnetic material;

a gap layer of a nonmagnetic material formed on top of said lower core layer;

a first insulation layer formed on top of said gap layer and having a first sloping region defining a first apex, said first apex being located on a surface facing a magnetic recording medium and defining a gap depth, said first sloping region includes an upper area adjacent to said first apex;

a coil layer formed on said first insulation layer and being located at a first distance from said first apex;

a second insulation layer laminated on said first insulation layer so as to cover said coil layer, said second insulation layer having a second sloping region defining a second apex, said second apex being located on the surface facing the magnetic recording medium at a second distance from said first apex, said second sloping region includes an upper area adjacent to said second apex;

a third insulation layer formed on said first insulation layer in a bared area between said first and second apexes, said third insulation layer having an inclined plane sloping upwardly, at an angle less than 45° with respect to the top of said gap layer, said inclined plane gently connecting the upper area of the first sloping region and the upper area of the second sloping region; and an upper core layer of a magnetic material having a tip region, a connecting portion and a body portion, said tip region being located on a surface facing the magnetic recording medium and establishing a magnetic gap via said gap layer, said body portion being formed on top of said second and third insulation layers and having a back end region being in contact with said lower core layer, and said connecting portion connecting between said tip region and said body portion, and being formed on top of said first and third insulation layers.

2. A thin film magnetic head as set forth in claim 1 wherein:

the length of said first distance is greater than 10 μm.

3. A thin film magnetic head as set forth in claim 1 wherein:

the length of said second distance is in the range of 6 μm to 10 μm.

4. A thin film magnetic head as set forth in claim 1 wherein:

said inclined plane slops upwardly at an angle in the range of 15° to 30°.

5. A thin film magnetic head as set forth in claim 2 wherein:

the length of said second distance is in the range of 6 μm to 10 μm.

6. A thin film magnetic head as set forth in claim 2 wherein:

said inclined plane slops upwardly at an angle in the range of 15° to 30°.

7. A thin film magnetic head as set forth in claim 4 wherein:

said inclined plane slops upwardly at an angle in the range of 15° to 30°.

8. A thin film magnetic head as set forth in claim 5 wherein:

said inclined plane slops upwardly at an angle in the range of 15° to 30°.

* * * * *

UNITED STATES PATENT AND TRADEMARK OFFICE
CERTIFICATE OF CORRECTION

PATENT NO.    : 6,400,527 B1
DATED         : June 4, 2002
INVENTOR(S)   : Hideki Gochou et al.

It is certified that error appears in the above-identified patent and that said Letters Patent is hereby corrected as shown below:

<u>Column 28,</u>
Lines 27, 35, 40 and 43, delete "slops" and substitute -- slopes -- in its place.

Signed and Sealed this

Eighteenth Day of March, 2003

JAMES E. ROGAN
*Director of the United States Patent and Trademark Office*